INVENTOR.
HILARY A. RAAB
BY Charles S. Penfold
ATTORNEY

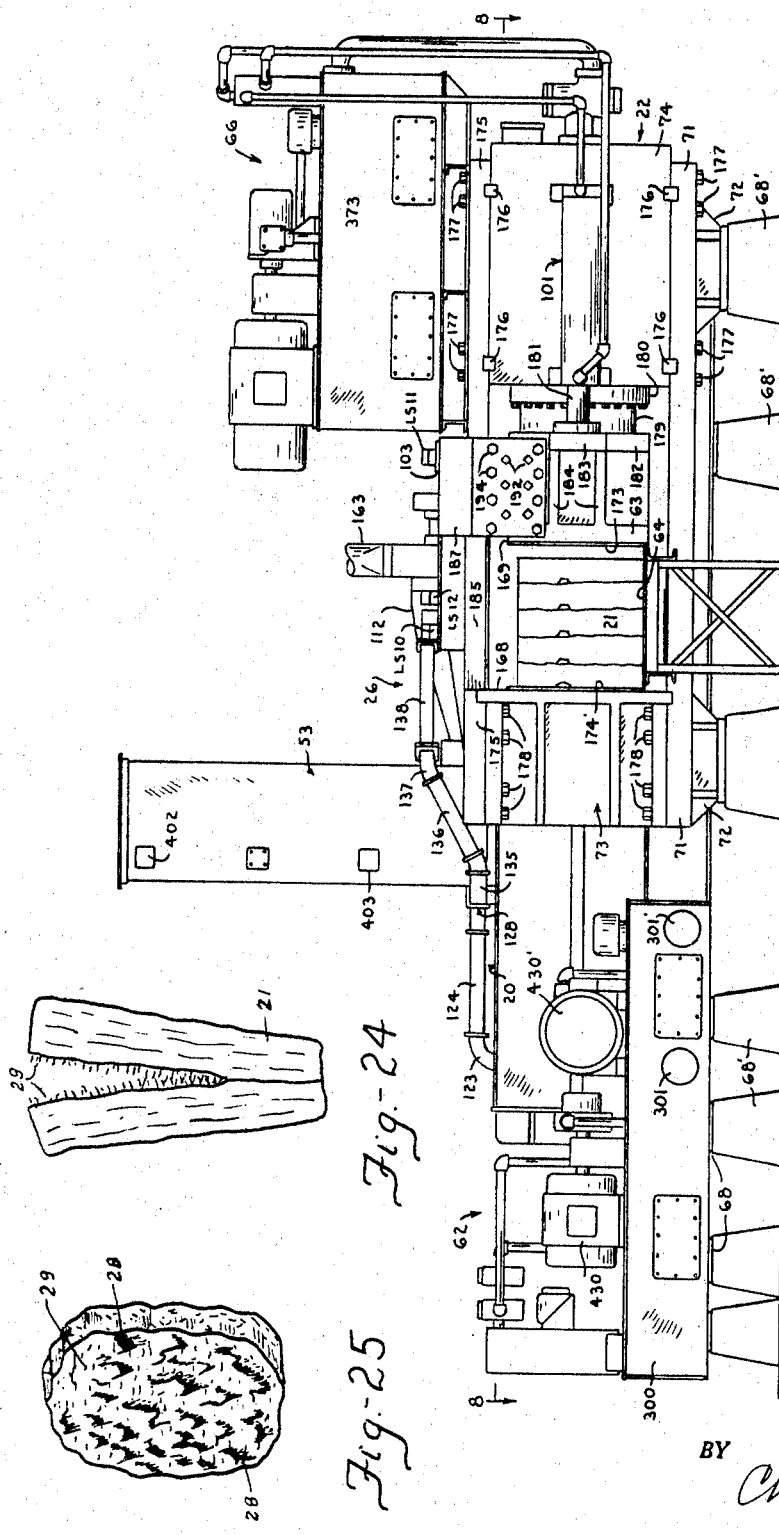

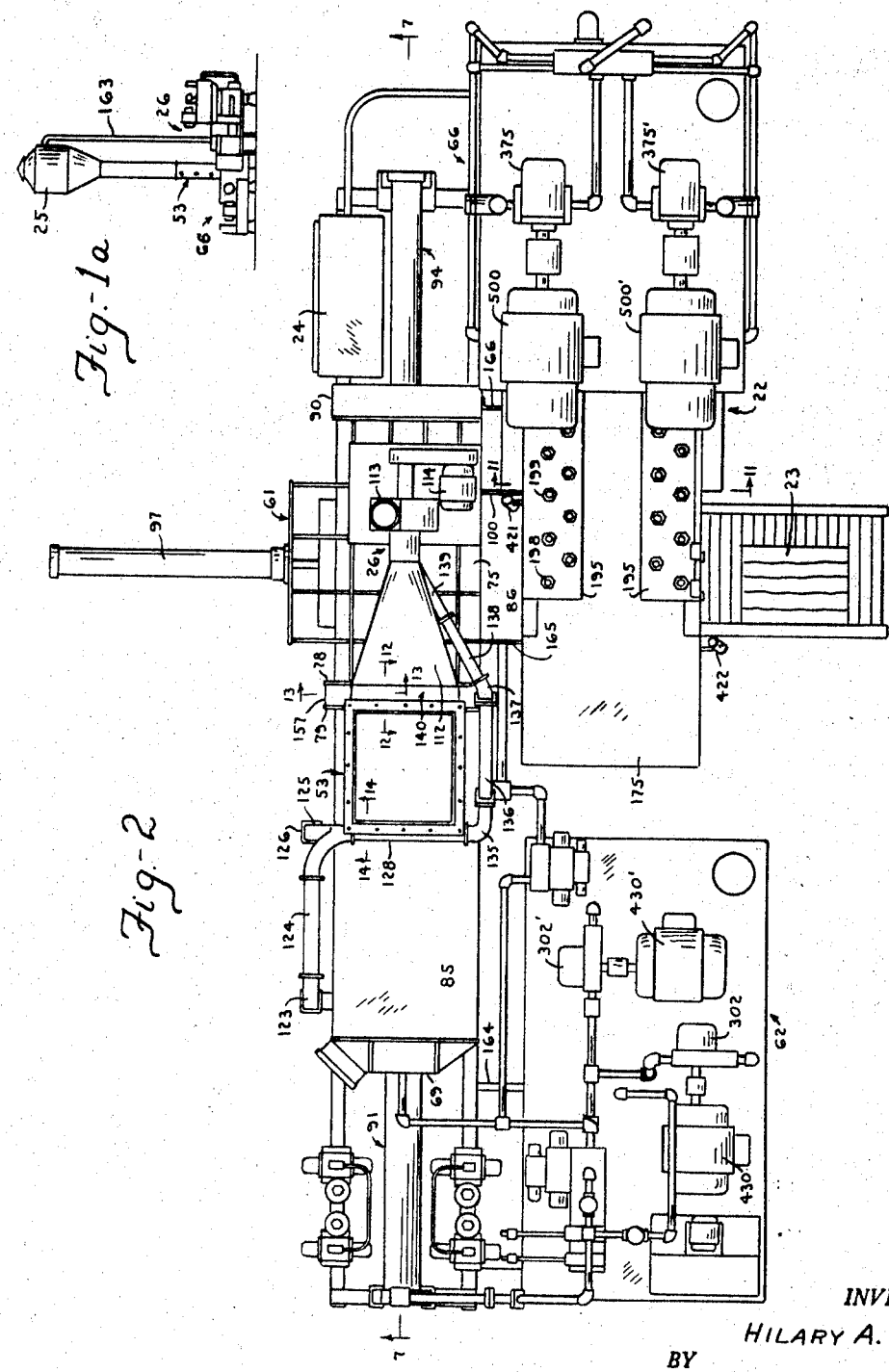

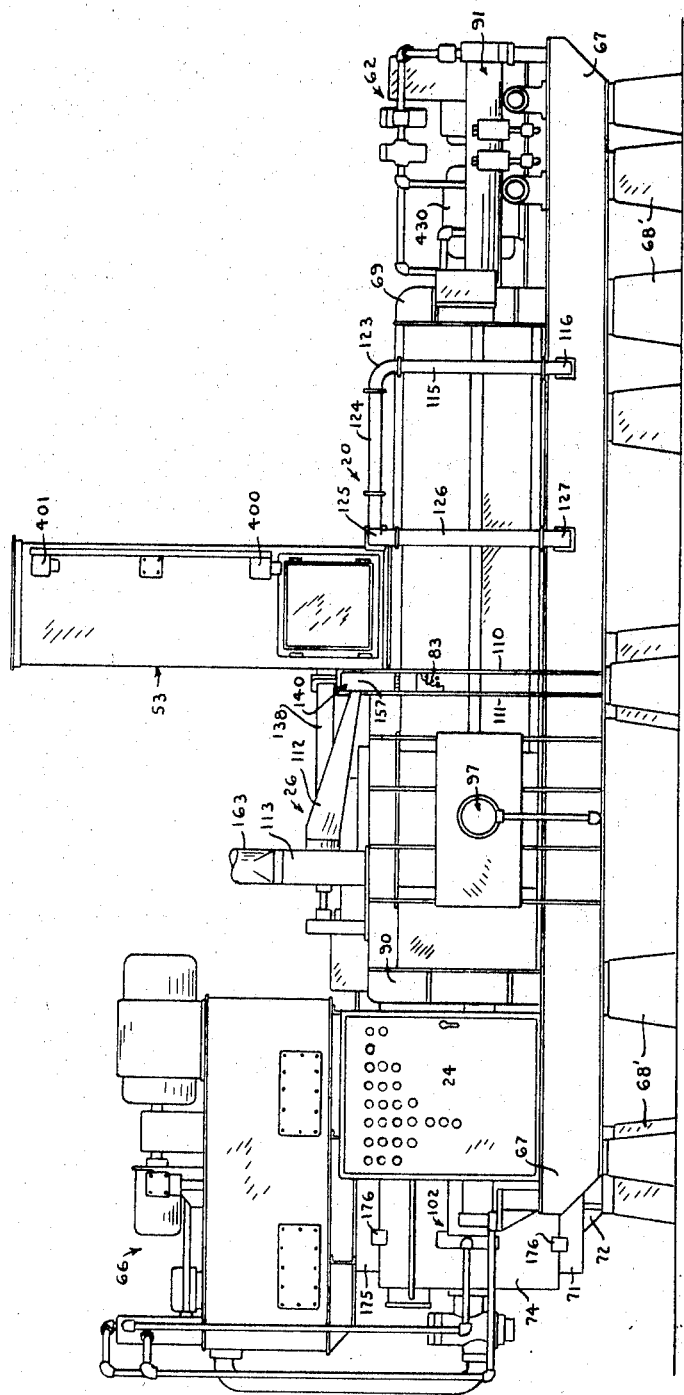

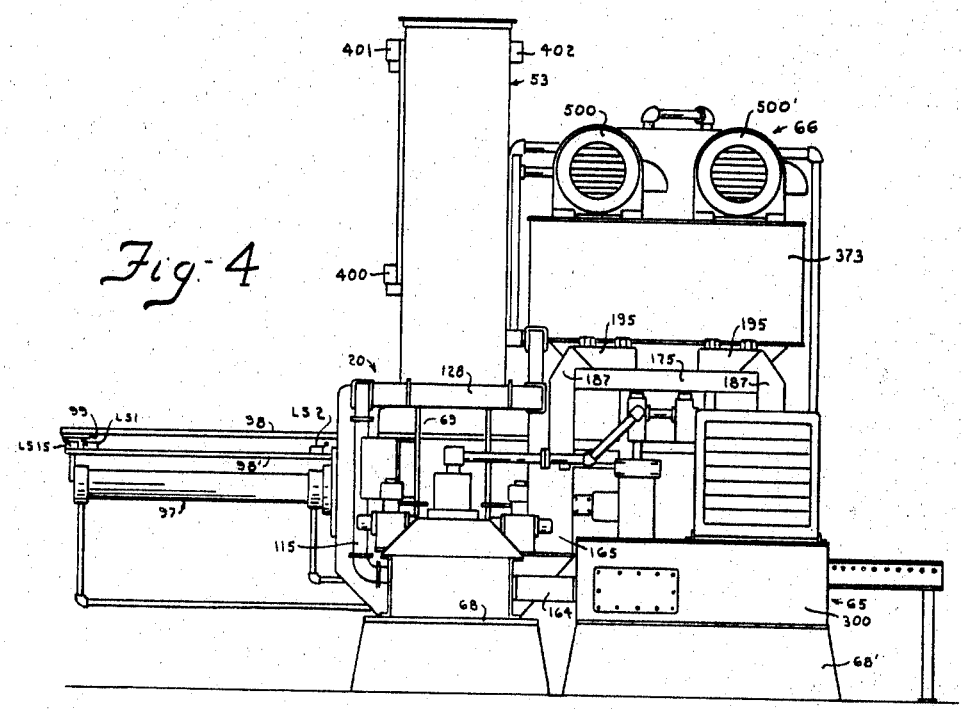
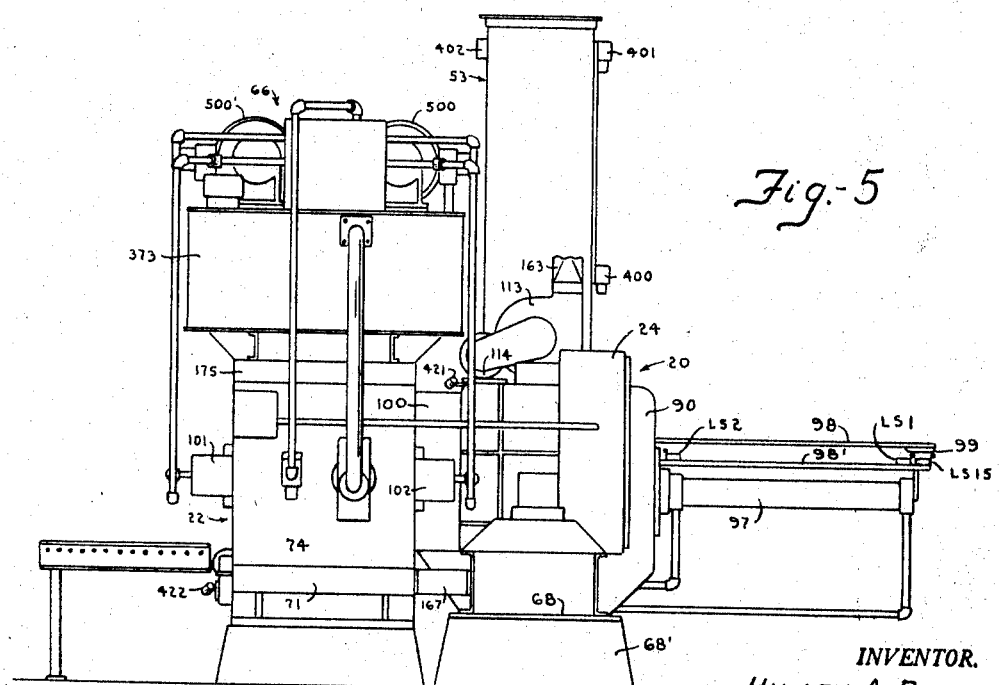

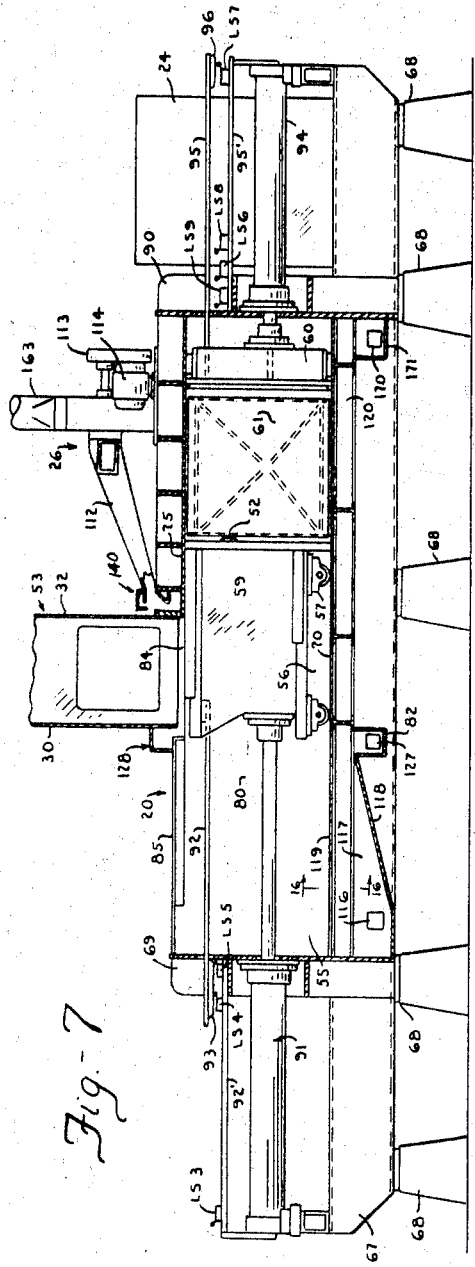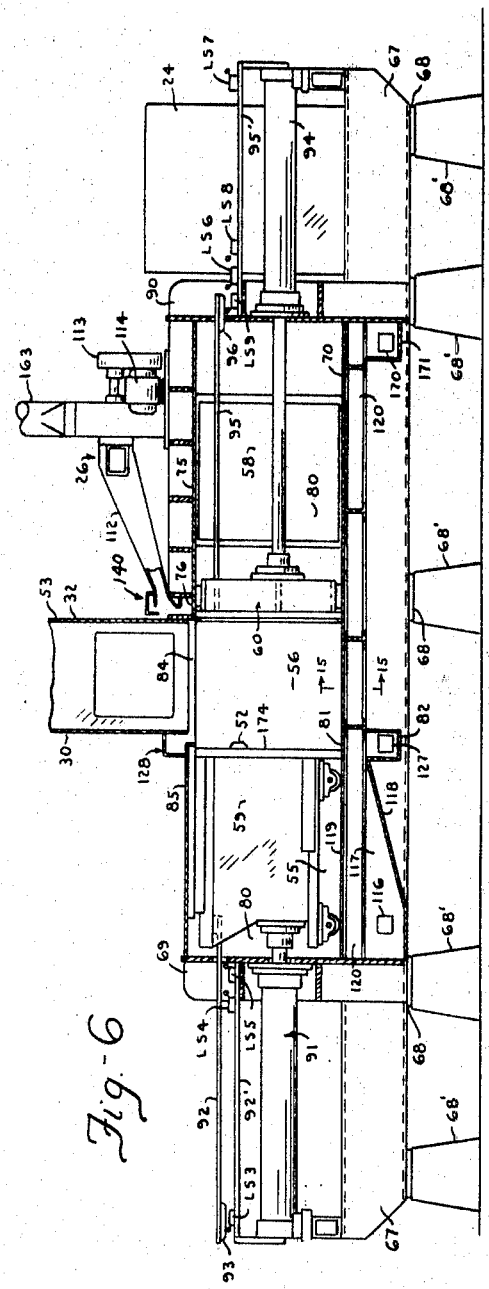

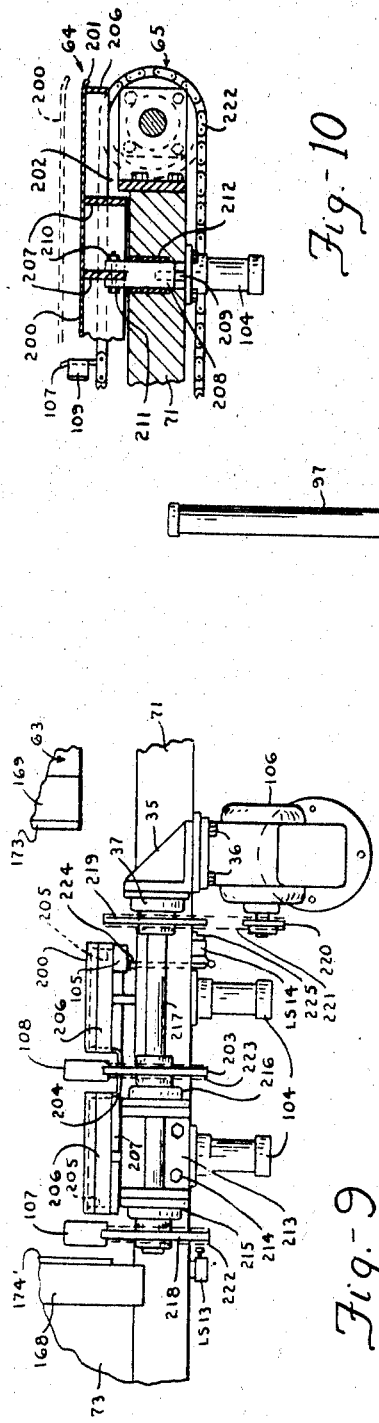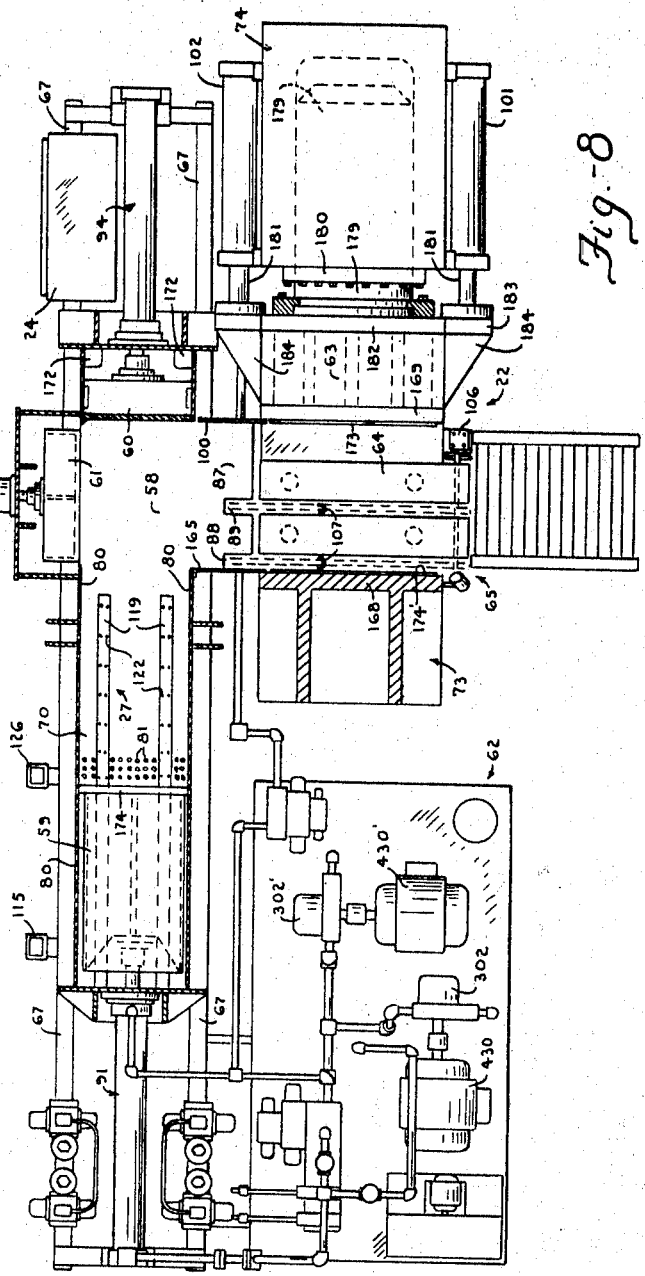

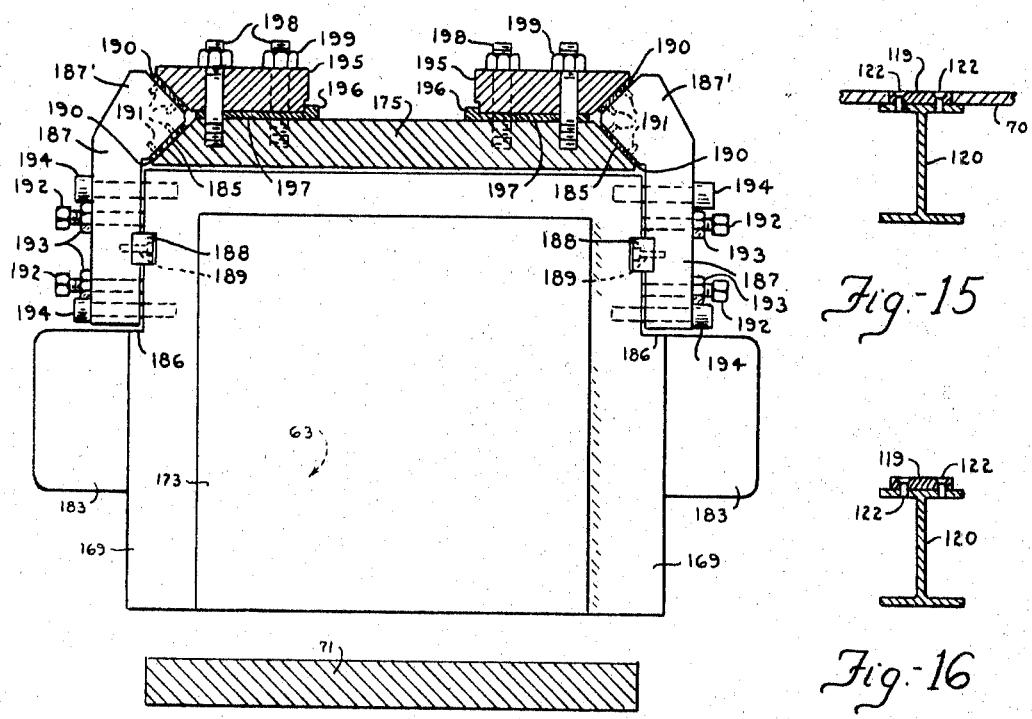
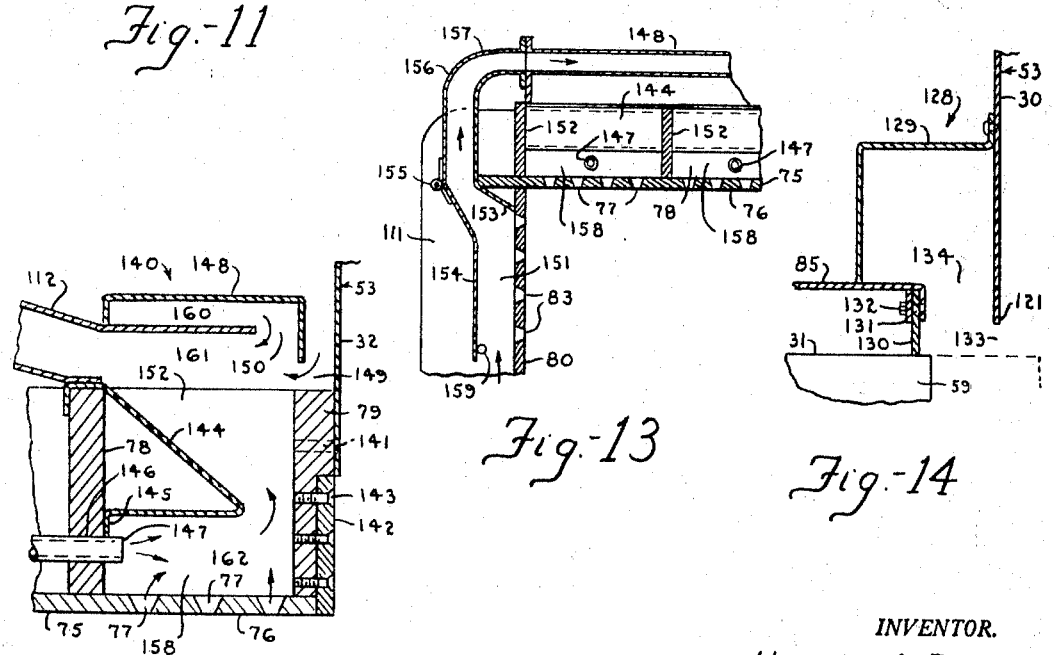
Fig.-11  Fig.-15  Fig.-16  Fig.-12  Fig.-13  Fig.-14

United States Patent Office 3,438,320
Patented Apr. 15, 1969

3,438,320
APPARATUS AND METHOD FOR
COMPACTING MATERIAL
Hilary A. Raab, Hammond, Ind., assignor to East Chicago
Machine Tool Corporation, East Chicago, Ind., a corporation of Indiana
Filed July 11, 1966, Ser. No. 564,337
Int. Cl. B30b 13/00, 15/26
U.S. Cl. 100—35                     43 Claims

ABSTRACT OF THE DISCLOSURE

The invention, among other things, is directed to a machine and method whereby a pair of reciprocable rams coact to compact and move material in an elongated chamber to a position opposite an opening intermediate the length of the chamber, utilizing a third ram for ejecting all of the compacted material transversely through the outlet, and means including a fourth ram disposed adjacent to the outlet for recompacting the material into a mass of greater density.

---

The subject invention relates generally to means for compressing various materials and more particularly is directed to an apparatus and/or method whereby fibrous materials, such as pulp, are adapted to be compacted into a mass and/or into a bale.

A significant objective of the subject invention is to provide an apparatus which, among other things, comprises an elongated chamber provided with an inlet adjacent one extremity for receiving material and with an outlet adjacent its opposite extremity, a primary ram and a resistance ram for compacting the material in the chamber into a layered mass of predetermined density, a platform located adjacent the outlet, an ejector ram for ejecting the mass through the outlet onto the platform, and coactible means preferably comprising a stationary abutment and a compress ram for recompacting the mass to a higher or greater density into a self-standing bale. Otherwise expressed, the material is compacted into a mass having a predetermined density, removed from the chamber, and then recompacted while supported solely by the coactible means to a greater density to obtain a bale.

Another object of the invention provides for a unique method of compacting material in a manner whereby to prevent rolling of the material adjacent side walls during high compression, thereby preventing glazing of the material which would affect the properties thereof.

An important object of the invention is to provide an organization whereby the platform, above referred to, may be raised to position the mass for clamping, then lowered out of the way to facilitate recompaction by the coactible means.

A specific object of the invention is to provide transfer means operable in conjunction with the platform and coactible means for transfering the bale onto a conveyor adjacent the platform for transport to any desired location.

An additional important object of the invention is to provide an apparatus of the above character which preferably includes fluid power means for operating the various rams and a plurality of interconnected controls for synchronizing their operation, including the operation of the platform and transfer means.

A specific object of the invention is to provide an organization whereby the bale is automatically freely released from the coactible means and so that the conveyor means can efficiently transfer the bale without damage thereto.

Another specfic object of the invention is to provide guide means which are associated with the abutment and compress ram constituting the coactible means whereby to facilitate and insure correct ejection or discharge of the mass through the outlet of the chamber onto the platform.

A further object of the invention is to provide an elongated chamber which is of a sufficient length so that the extremity thereof provided with the inlet constitutes a receiving area or chamber, its opposite extremity provided with the outlet constitutes an area or chamber from which the mass is ejected, a space therebetween constitutes a forming area, and a compartment is provided for the primary ram.

Another object of the invention is to provide the apparatus with unique venting or exhaust means whereby the material receiving and forming areas of the elongated chamber may be vented to continuously maintain them in a condition whereby to facilitate introduction and compaction of the material, and also maintain the compartment free of fibers and dust and prevent the escape of any dust or fibrous material from the apparatus into the atmosphere thereabout. More specifically in this respect, retraction of the primary ram will pressurize the compartment to assist in preventing entry of fibers therein and also create a negative pressure in the elongated chamber to facilitate introduction of the material into the receiving area.

Another significant object of the invention is to provide the apparatus with a cyclone or source of material supply and a chute of appreciable height which communicatively connects the cyclone with the inlet of the elongated chamber, and conduit means communicatively connects the venting means with the cyclone so that any dust or loose fibers drawn from the elongated chamber and compartment will be directed or conveyed through the conduit means back to the cyclone or source for reflow through the chute into the chamber for compaction with a mass.

A particularly significant object of the invention is to provide an apparatus or system in which the chute communicatively connected to the elongated chamber will receive or absorb all of the material being delivered to it during an ejection cycle of the operation and whereby the primary ram and resistance ram substantially continuously cooperate in conjunction with the flow through the chute, as distinguished from certain systems currently in use. Otherwise expressed, the flow of material to the elongated chamber and the cycling operations of the system are synchronized so that the apparatus may operate at full capacity.

A specific object of the invention is to provide means for forcefully introducing a stream of air into a compartment of the venting means whereby to positively insure a continuous flow of air therethrough, and thereby prevent any piling up of material therein.

Another object of the invention is to provide the apparatus with means for maintaining the upper surface of the primary ram in a clean condition and means adjacent thereto and the chamber inlet whereby to positively assist the escape of air from the receiving area of the chamber.

Another object of the invention is to provide readily replaceable track means for the primary ram.

Also, an important object of the invention is to provide a system in which the controls, above referred to, for synchronizing or cycling the operation of the various rams, platform and transfer means are operatively connected and related to the height of the chute or volume of the material flowing therethrough, in order to obtain continuous maximum output.

A further object of the invention is to provide a compress ram embodying improved principles of design and construction and unique means whereby the ram is supported and stabilized for reciprocatory movement.

A specific object of the invention is to provide improved track means for the compress ram which are preferably of a non-metallic, self-lubricating character.

Also, an object of the invention is to provide a method whereby material is formed into a layered mass and then recompressed into a bale of high density in which the identity of the layers is substantially eliminated, but still allows for separation thereof by a force greater than that required to separate the layers of the mass.

Another important object of the invention is to provide a method of compacting material into a mass of layers so that the opposed faces of layers are more or less held initially together by what may be termed a nesting relationship of at least some of the fibers, resulting from bending and distortion, and when the mass is recompressed the nested fibers are forced to take a set whereby to firmly connect or join the layers together. In other words, when the mass is recompressed by the coactible means, the fibers forming the opposed faces of the layers are subjected to tremendous pressures in excess of their elastic limits and thereby obtain a setting thereof to produce bonds joining the layers together to form a self-standing bale having a density appreciably greater than that of the mass.

A specific object of the invention is to provide means such as tongues and grooves in the layers of the mass by providing the primary ram with forwardly extending projection means whereby to additionally assist in joining or interconnecting the layers of the mass and the bale.

A further object of the invention is to provide a unique organization whereby the primary press and secondary press may be readily detachably connected to provide a unitary apparatus for compacting material into a mass and into a bale or for separation for operation as independent machines or units.

Another specific object of the invention is to provide a setup whereby any oils or lubrication utilized in conjunction with the apparatus will not come into contact with the mass or bale during compaction and recompaction.

Additional objectives, attributes, or advantages of the invention residue in providing improved methods with respect to compaction, recompaction, cycling, programming, efficiency, tremendous output, automatic operation and durability.

Many additional objects and advantages of the invention will become apparent after the description hereinafter set forth is considered in conjunction with the drawings annexed hereto.

In the drawings:

FIGURE 1 is a front elevational view of the apparatus;

FIGURE 1a is an elevational view showing in combination a cyclone for material which travels downwardly into a chute constituting a component of the apparatus and conduit means connecting the cyclone with a venting means of the apparatus;

FIGURE 2 is a top plan view of the apparatus shown in FIGURE 1;

FIGURE 3 is a rear elevational view of the apparatus shown in FIGURE 1;

FIGURE 4 is one end elevational view of the apparatus shown in FIGURE 1;

FIGURE 5 is an opposite end elevational view of the apparatus shown in FIGURE 1;

FIGURE 6 is a partial side elevational view of the apparatus, with portions in section depicting the primary ram and resistance ram in positions for initially receiving material in the elongated chamber of the apparatus;

FIGURE 7 is a longitudinal section view taken substantially on line 7—7 of FIGURE 2 showing the primary ram and resistance ram in positions after the mass has been ejected;

FIGURE 8 is a horizontal sectional view of the apparatus taken substantially on line 8—8 of FIGURE 1, with portions in section whereby to illustrate structural details of the elongated chamber, a platform and the operative relationship of the various rams above referred to;

FIGURE 9 is an enlarged partial sectional view showing the platform and transfer means of the machine;

FIGURE 10 is an enlarged sectional view showing additional details of the platform and transfer means of the machine;

FIGURE 11 is an enlarged vertical section taken substantially on line 11—11 of FIGURE 2 whereby to illustrate the structural characteristics of the compress ram and manner in which the same is mounted;

Figure 17:
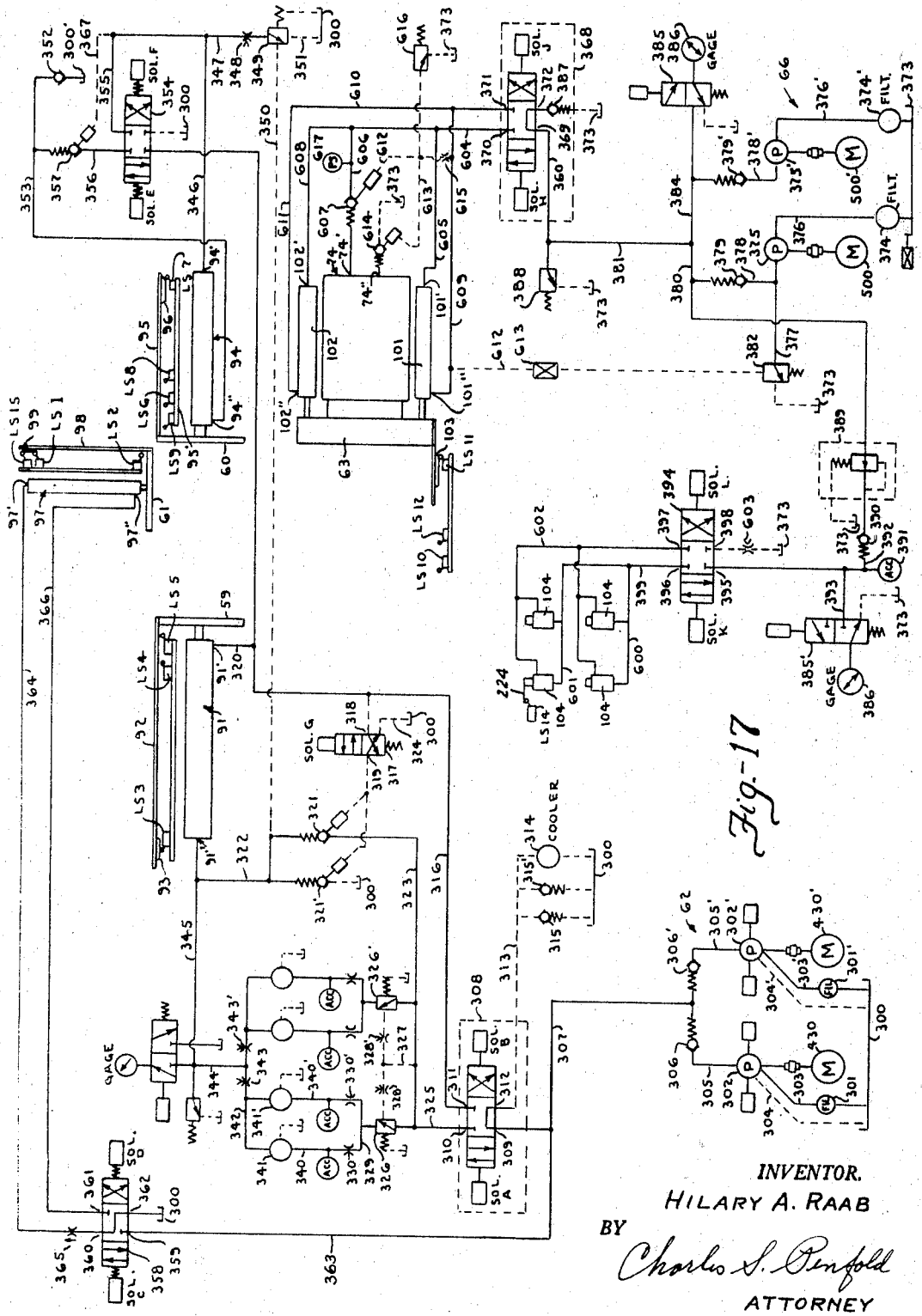
Figure 18:
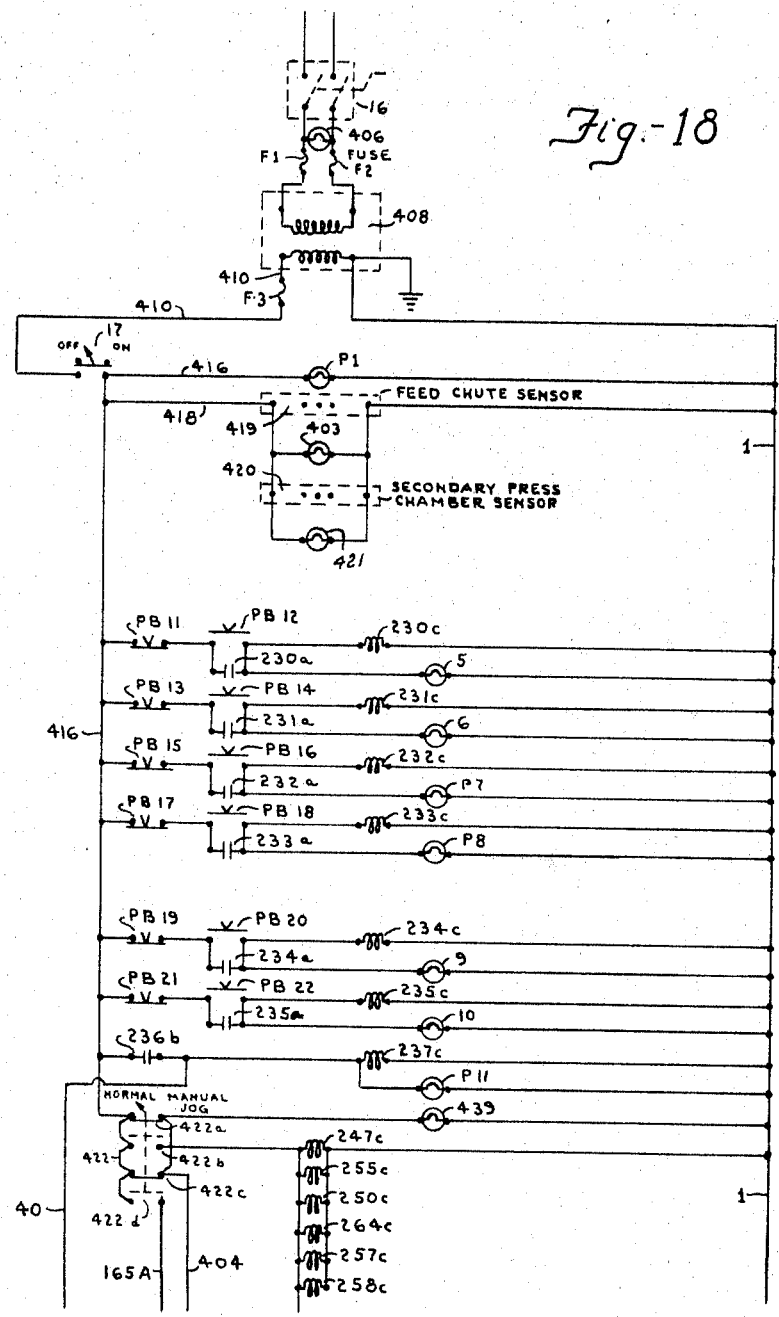
Figure 19:
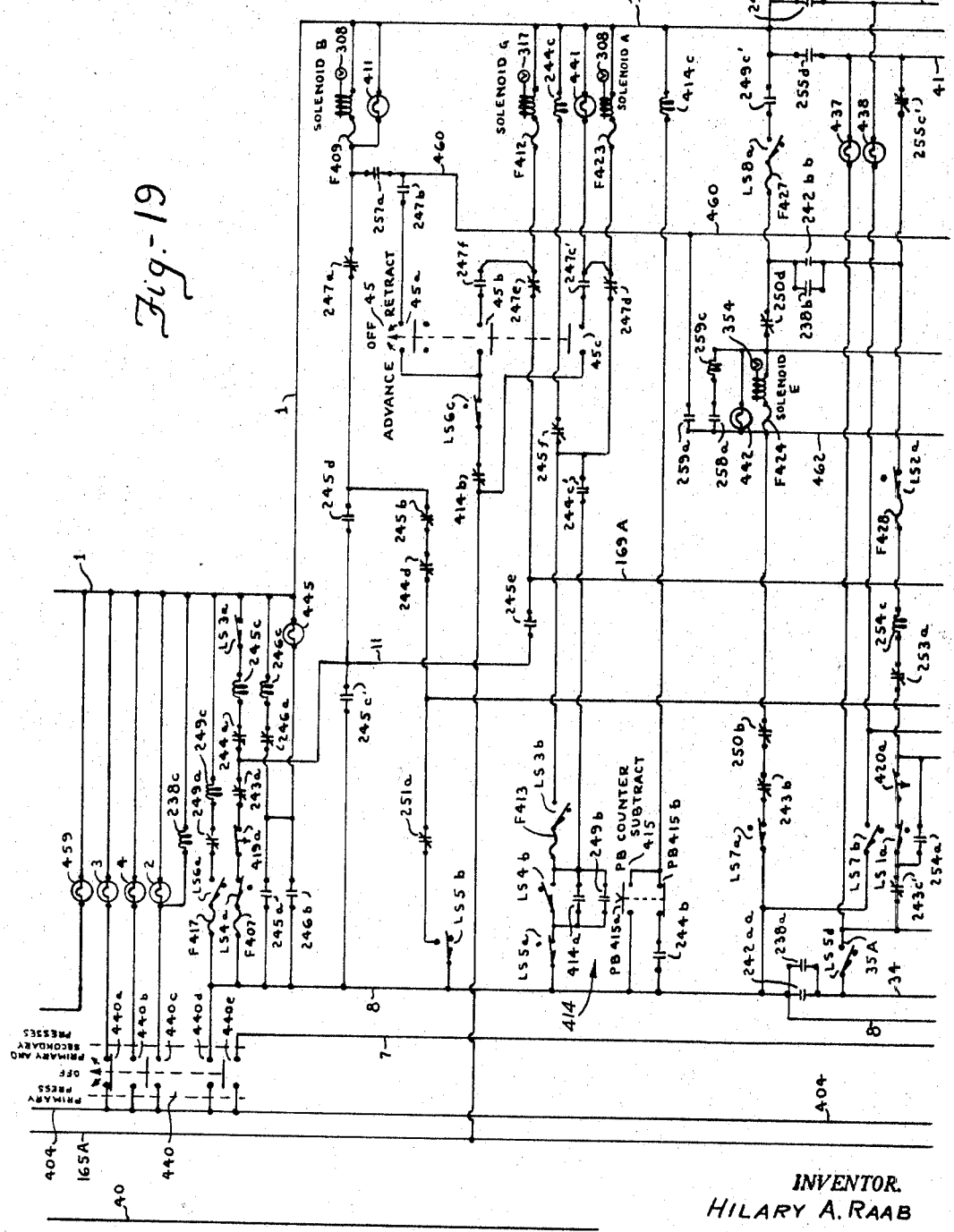
Figure 20:
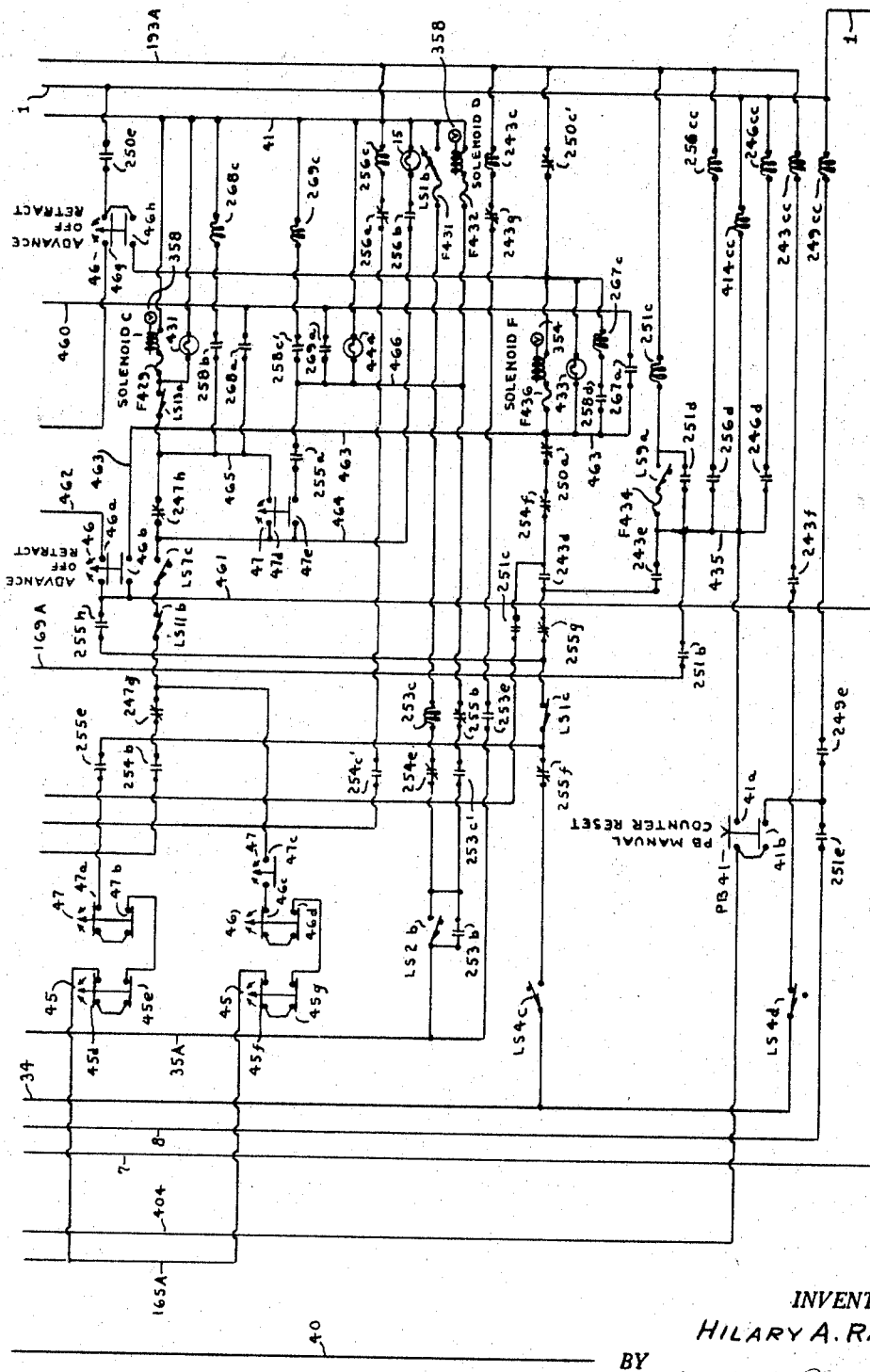
Figure 21:
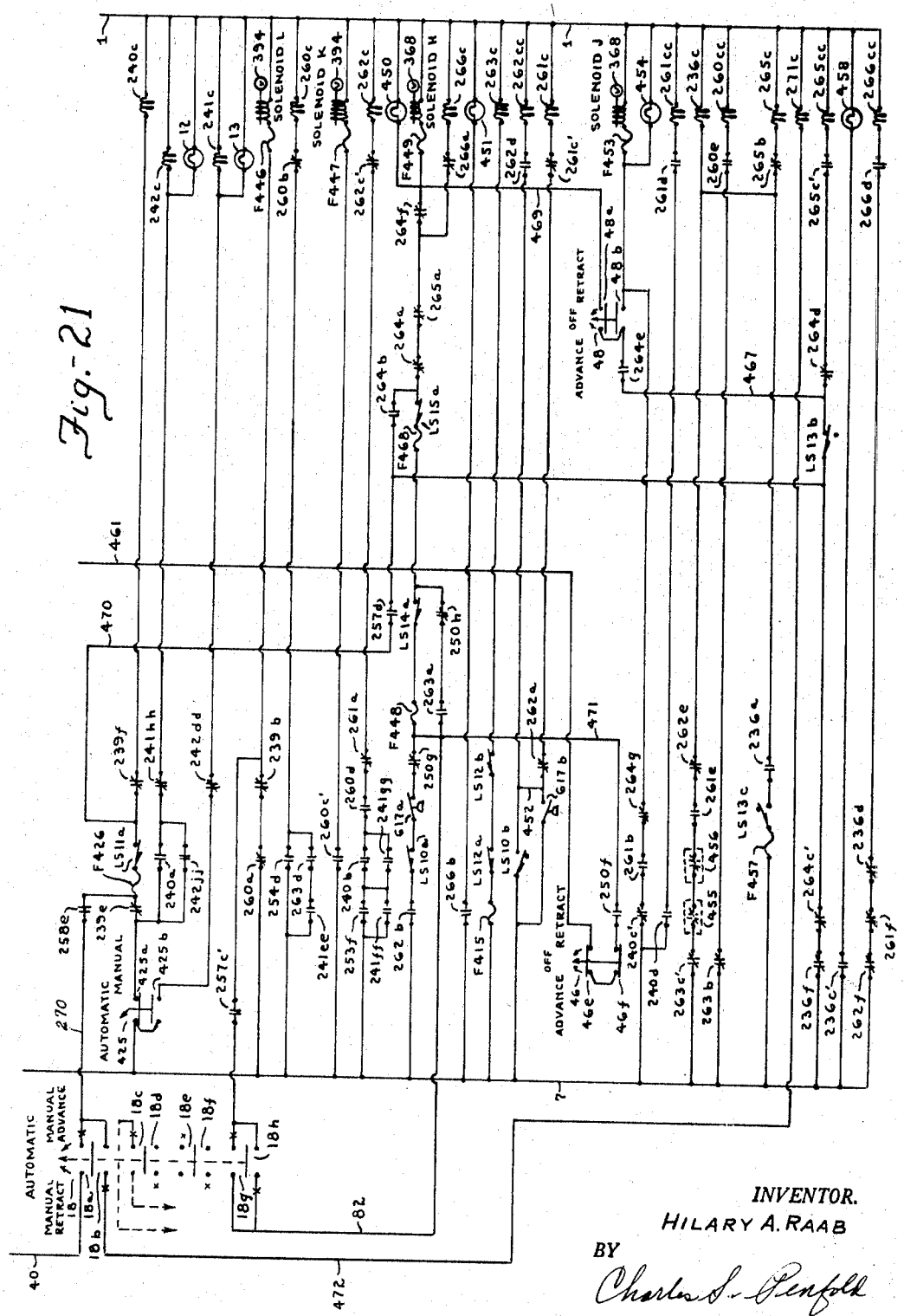

FIGURES 12 and 13 constitute enlarged partial sectional views taken on lines 12—12 and 13—13 of FIGURE 2 showing details of the venting or exhaust means above referred to;

FIGURE 14 is an enlarged partial vertical sectional view taken substantially on line 14—14 of FIGURE 2 for the purpose of depicting means for maintaining the primary ram in a clean condition and adjacent means whereby to assist in preventing clogging of any material adjacent the inlet of the elongated chamber;

FIGURE 15 is an enlarged vertical section taken substantially on line 15—15 of FIGURE 6 showing one of a pair of replaceable track means for the primary ram;

FIGURE 16 is an enlarged vertical section taken substantially on line 16—16 of FIGURE 7 showing a rearward extension of one of a pair of track means for the primary ram which are intended to be replaceable;

FIGURE 17 is a diagrammatic view of the hydraulic circuitry which, among other things, is utilized to operate the various rams and related components;

FIGURES 18, 19, 20 and 21 are views showing the electrical system;

FIGURE 22 is a perspective view of a layered mass of material which has been formed by the primary ram and resistance ram of the apparatus;

FIGURE 23 is a perspective view of a bale which is formed by recompacting the mass depicted in FIGURE 22;

FIGURE 24 is an elevational view of a portion of the mass shown in FIGURE 22, with portions of a pair of adjacent layers parted to illustrate the nesting of the fibers in the opposed faces of the layers; and FIGURE 25 is a partial perspective view of a portion of the mass showing the character of a compressed face thereof.

The apparatus embodying the subject invention may be designed and constructed in various ways, and as exemplified in FIGURES 1, 1a, 2 and 8 of the drawings it includes a primary press generally designated 20 which serves to compact the material into a layered mass 21 to a predetermined density, a secondary press designated 22 for recompacting the mass into a bale 23 of greater density, a feed chute 53, a cyclone 25 and an exhaust system 26.

The primary press 20, among other things, comprises a structure providing an elongated chamber generally designated 27, a ram compartment 55, a material receiving area 56, a forming area 57, an ejection area 58, a primary ram 59, a resistance ram 60, an ejector ram 61, power means generally designated 62 as depicted in FIGURES 1, 2, 8 and 17 for operating the primary ram to compact material received in the chamber against the resistance ram or platen, and fluid operable means operatively connected to the power means and the resistance ram whereby to offer resistance to the travel of the latter with the material being compacted and for controlling the amount of power applied by the power means to the primary ram. The primary ram 59 is provided with forwardly extending projection means 52 whereby to form tongues and grooves in the layers whereby to assist in interconnecting or joining the layers of the mass and the bale.

The primary press 20, as above referred to, is utilized to compact material received in the chamber and especially offers advantages with respect to compacting fibrous materials, such as pulp, which may be conveyed by conventional means to and through the chute 53 from the cyclone 25. More particularly, the chute in directing the flow of material to the chamber 27 absorbs surges between the capacity of the apparatus and excess material delivery and also serves to insure a static head of material in the chute over the receiving area whereby to promote maximum capacity of the primary press and promote uniform density of the mass in vertical planes.

The secondary press 22 includes the compress ram 63, the associated platform 64 for successively supporting the mass and bale, the transfer means 65 as depicted in FIGURES 8 and 10, and the power means generally designated 66 for operating the compress ram and the platform which supports the mass 21 as received from the primary press until the compress ram clamps the mass against the abutment means 73. The fluid operable means operatively connected to the power means and the platform offers a setup whereby the platform may be lowered to enable the compress ram to further compact the mass clamped therebetween.

The primary press 20 as shown in FIGURES 3, 7 and 8, is preferably constructed from relatively heavy stock to provide, among other things, a substantial frame having a pair of longitudinal beams 67 supported on anchoring plates 68 carried by pillars 68', end wall structures 69 and 90, and a horizontal wall 70, supported by the beams 67 and constituting a bottom wall of the elongate chamber 27. The material receiving area 56 constitutes a continuation of the compartment 55, the forming area 57 a continuation of the receiving area, and the ejection area 58 a continuation of the forming area. The structural characteristics of the chambers will be described more in detail subsequently.

The secondary press 22 of the machine is preferably constructed from very heavy stock to include a substantial frame having a thick horizontal base plate 71 supported on bases 72, an abutment means 73, and a cylinder block 74.

The apparatus also includes a cabinet 24 within which the majority of the electrical controls are disposed, and the power means 62 includes fluid control components of the hydraulic circuitry for the primary press, and the power means 66 shown in FIGURE 3 includes fluid control components of the hydraulic circuitry for the secondary press 22, as illustrated in FIGURE 17.

The receiving, forming and ejection areas 56, 57 and 58 and compartment 55 are generally defined in part by a stationary top wall 75 which is disposed above and in parallel relationship to the bottom wall 70 of the primary press. A portion 76 of the top wall 75 in the area 57, as illustrated in FIGURES 12 and 13, is provided with rows of inverted truncated cone openings 77 running across the width of the chamber 27 between and parallel to horizontal supports 78 and 79 and a pair of fixed vertically disposed parallel walls 80 constituting the sides of the chamber 27. The upper portions of the side walls 80 are provided with inverted truncated cone apertures 83. As depicted in FIGURE 8, the bottom wall 70, in the area immediately ahead of the retracted position of the primary ram 59 is provided with rows of truncated cone holes 81 which are encased by a trough 82 as illustrated in FIGURE 6. The openings 77 in the portion 76 of the top wall, and the apertures 83 in the side walls 80 provide for fluid escape while the material is being charged into the receiving area 56 or is being compacted in the forming area 57 between the primary ram 59 and resistance ram 60.

The top wall 75, as depicted in FIGURE 6, is provided with an inlet 84, communicating with the chute 53 through which the material is initially received in the area 56. This wall extends between the chute and the end wall structure 69 and includes a portion 85 extending to the left of the chute and constitutes a top wall of the ram compartment 55. As shown in FIGURE 2, a side portion 86 of the top wall in the area of the ejection area 58 is extended, and the bottom wall 70 as shown in FIGURE 8, at the outlet or discharge side of the ejection area also has an extended portion 87 which is notched at 88 and 89.

The primary ram 59 is reciprocated by a cylinder means 91 and provided with a rearwardly extending bar 92 which carries an abutment 93 adjustably mounted thereon. The abutment 93 is disposed for engagement with adjustably mounted switches LS3, LS4 and LS5 carried by a support 92' whereby to control the travel of the primary ram during certain cycles, all of which will be described more in detail subsequently.

The resistance ram 60 is reciprocated by a cylinder means 94 and provided with a rearwardly extending bar 95 which carries an abutment 96 adjustably mounted thereon. The abutment 96 is disposed for engagement with adjustably mounted switches LS9, LS6, LS8 and LS7 carried by a support 95' whereby to control the travel of the resistance ram during certain cycles, as well as control other operations, all of which will be described more in detail subsequently.

The ejector ram 61 is reciprocated by a cylinder means 97 and provided with a rearwardly extending bar 98 which carries an abutment 99 adjustably mounted thereon. The abutment 99 is disposed for engagement with adjustably mounted switches LS1, LS2 and LS15 carried by a support 98' whereby to control the travel of the ejector ram during certain cycles, as well as control other operations, all of which will be described more in detail subsequently.

The compress ram 63 of the secondary press 22 is reciprocated by the cylinder means 74, and the cylinder means 101 and 102, and provided with an abutment 103 which is disposed for engagement with adjustably mounted switches, LS11, LS12 and LS10 whereby to control the travel of the ram during its cycle, as well as control other operations, all of which will be described more in detail subsequently.

The platform 64 above referred to and as shown in FIGURES 8 and 10 is raised and lowered by cylinder means 104 and provided with a plate 105 having a trip rod 224 which is disposed for engagement with a switch LS14 whereby to control the travel of the platform, as well as other operations, all of which will be described more in detail subsequently.

The transfer means 65, which is operatively associated with the platform 64 is actuated by power means 106 and provided with bars 107 and 108 for pushing the bale 23 out of the secondary press. The bar 107 is provided with a trip plate 109 disposed at right angles thereto for engagement with a switch LS13, whereby to control the travel of the transfer means 65 and certain other operations, all of which will be described more in detail subsequently.

The venting or exhaust means 26 which will now be described, serves to increase the capacity of the primary press and obtain a more efficient formation of bales and retains to a minimum any free dust which, if allowed to permeate the atmosphere, would cause problems, such as contamination of the equipment, controls and personnel.

Referring more particularly to the exhaust system 26, as illustrated in FIGURES 1, 2, 3, 6, 7, 8, 12, 13 and 14, the apertures 83 provided in the upper portions of the side walls 80 of the elongated chamber 27 extend vertically in the area between support bars 110 and 111 which constitute vertical continuations of the horizontal supports 78 and 79, above referred to. All of the perforated portions of the side and top walls are shrouded to provide conduits or passages which lead to a manifold or common header 112 connected to an exhauster 113 driven by a motor 114. The system, as specifically shown in FIGURES 3, 7 and 8, also includes a vertical conduit 115 which is attached at its lower end to one of the frame members 67 and has an inlet 116 communicating with a dust receiving receptacle 117 which is disposed below the ram compartment 55 and defined by the left end wall structure 69, a pan plate 118, the horizontal frame members 67, a wall of a transversely disposed trough 82 and a pair of spaced horizontal tracks 119 constituting bottom walls of the ram compartment 55. As depicted in FIGURES 6, 7, 8, 15 and 16, the bottom wall 70 of the chamber 27 and the tracks 119 are supported by a pair of underlying longitudinally extending beams 120. The bottom wall is parted to define in combination with the upper surfaces of the beams a pair of longitudinally extending recesses which receive the replaceable wear tracks 119 which are fastened to the beams with screws 122. The replaceable tracks 119 support the wheels of the primary ram 59.

The upper end of the vertical conduit 115 is connected by an elbow 123 to a horizontal conduit 124 and the latter is connected to a conduit 125. A vertical conduit 126 attached to one of the frame members 67 is connected to the conduit 125 and its lower end communicates with an opening 127 leading to the trough 82.

A casing 128, as shown in FIGURES 2 and 14, is preferably formed in part by a wall 30 of the chute 53, a formed section 129 is attached to the wall 30, the top wall portion 85, a top surface 31 of the ram 59 and a ram wiper 130 which is reinforced by a bar 131 and attached to section 129 by fasteners 132. It will be observed that the wall 30 of the chute is extended as at 121 so that the bottom edge of the latter is spaced a predetermined distance from the upper surface 31 of the ram as indicated at 133. It is important that the dimension of the space 133 be less than that of a space 134, as will appear hereinafter. When the ram 59 is retracted under a column of material in the chute, the top surface of the ram tends to drag material rearwardly. The bottom edge portion 121 acts as a scraper restricting the material from following the ram under the edge. Some material, however, will press between the edge and the ram surface and it is important that the volume be less than can pass through the opening 134, otherwise the opening 134 will become blocked and prevent correct air venting from the receiving area 56 of the elongated chamber when the material in the chute 53 falls. Also, any air trapped in the mass collecting in the chute 53 would escape through the opening 133 and into the space 134 while the primary ram 59 is cycling, thereby allowing for precompaction of the mass in the chute 53. The casing 128 is connected to an elbow 135, thence to conduits 136, 137, 138 to an adapter 139 which connects with the manifold 112.

As depicted in FIGURES 3 and 12, the horizontal support 79 is attached to a wall 32 of the chute 53 by screws 141 and provided with a recess which receives a replaceable shear knife 142 secured by screws 143. The shear knife is of a length to be flush with the undersurface of the top portion 76 of the top wall 75. The support 79 constitutes a vertical wall fastened to the portion 76 and the vertical support 78 forms a wall opposed to the wall or support 79 and is fastened to the portion 76 preferably by welding. An angled deflector 144 is attached to the member 78 and has an edge portion abutting this member, as indicated at 145. The member 78 is provided with holes 146 for receiving air pressure nozzles 147. A cover duct structure designated 140 is attached to the manifold 112 and includes a top wall 148 and an opening 149 provided with an inlet to allow for free air passage and also with an opening 150 to allow for air passage from a chamber or passage 151. Vertical members 152 are welded to the supports 78 and 79 to give rigidity to the elongate chamber. The chamber or passage 151 is preferably formed by the side walls 80 of the elongated chamber, the vertical support bars 110 and 111, the top portion 76, a baffle 153, and a plate 154 which is hinged at 155 to a wall 156 of an elbow 157, the latter of which is attached to the duct structure 140. The system allows the air and dust to escape through the apertures 83 and 77 from the forming area 57 of the elongated chamber. Air from the atmosphere is freely received through the openings 116 and 127 provided in the beams 67, and through the unrestricted openings or passages 149 and 151. Suction pulls the plate 154 against an adjustable button 159 so that the area of the chamber may be reduced in a manner whereby to develop sufficient air velocity to keep any dust passing through the apertures 83 in suspension. This dust laden air then passes through the elbow 157 to a chamber 160 of the duct structure 140, thence through the opening 150 and mixes with any air coming through the opening 149 into a chamber 161 before passing into and through the manifold 112. The openings 77 evacuate into pockets 158, and streams of air are forced through the nozzles 147. To minimize the air required to develop sufficient velocity to suspend the dust, the deflectors 144 reduce the volumes in areas 162 of the pockets 158. The air and dust may then flow from the areas 162 into the chamber 161 where it mixes with the dust laden air from chamber 160 and all of it is then finally evacuated by the exhauster 113 which returns the dust and air to the cyclone or a source through a conduit 163, as depicted in FIGURE 1a. As noted above, this system of air venting or exhausting serves to increase the capacity of the primary press and obtains a more efficient formation of the bales by maintaining the elongate chamber 27 free of dust and prevents contamination of equipment, controls and personnel. One of the frame members 67 is provided with an opening 170 to facilitate cleaning of a chamber 171 which is located below the ejection area 58 as shown in FIGURE 6. This chamber receives dust and fall-off collected behind the resistance ram which falls into the chamber through openings 172 provided in the bottom wall 70 of the elongated chamber 27.

Referring again to the primary and secondary press structures 20 and 22, the same are preferably readily detachably secured together by tie plates 164, 166 and 167, as shown in FIGURES 2, 4 and 5. This organization permits the presses when connected to operate as a unitary apparatus or when disconnected as independent machines or units. Also, this organization affords time intervals for installation, maintenance and repair of the units. To assist in properly transferring the mass 21 from the primary press to the secondary press, a vertical guide plate 165, as shown in FIGURE 8, is connected to one of the side walls 80 of the elongated chamber and to a heavy plate 168 of the abutment means 73, for alignment with a face plate 174' carried by the plate 168. A face plate 174 carried by the primary ram 59 will be in alignment with the guide 165 when the ram 59 is in its fully advanced position. Also, a vertical face plate 173 is attached to a portion 169 of the compress ram 63 and in alignment with a fixed guide plate 100 also carried thereby which extends outwardly in parallel relation to the guide 165 and in close relationship with respect to an edge of the resistance ram 60 of the primary press.

The cylinder means 101 and 102 are attached to opposite sides of the cylinder block 74 and serve to impart thrust to the compress ram 63 during its forward travel and also effect its retraction. The compress ram 63 is suspended from the top plate 175 and attached to the piston 179 and the piston rods 181 of the cylinder means 101 and 102, as illustrated in FIGURE 8. The piston 179 is sealed against leakage by conventional means, such means being adjustable for wear by a gland ring 180. A back plate 182 of the compress ram has offset portions 183 supported by gussets 184 to which the cylinder rods 181 are fastened. The face plate 173 of the compress ram extends to the bottom of the portion 169 of the ram and has cross dimensions larger than the face of a mass and/or bale. The face plate 174' on the plate 168 of the abutment means is positioned in the same general relationship as face plate 173 of the compress ram 63, but preferably extends at least one inch lower than the face plate 173. The faces of the plates 173 and 174' are preferably polished to prevent the masses and bales from adhering thereto. The face plates are larger than the cross-dimensions of the bale to prevent what is termed bale face edge "flash."

Novel means are provided for supporting and guiding the compress ram to positively insure stabilized axial reciprocatory movement thereof and in a manner whereby its face plate 173 is continuously maintained in parallel relationship to the face plate 174' of the abutment means 73, and thereby to correctly shape the bale without the necessity of using additional walls which confine and tend to glaze the external surfaces of the bale. Provision is made for adjusting the compress ram for the purpose of taking up any wear without effecting the alignment and stability of the structure.

As depicted in FIGURE 11, the side edges of the top plate 175 in the area of the compress ram stroke are bevelled as indicated at 185, and the side walls of the ram 63 are recessed as at 186. Guides 187 are fixed in the recesses of the ram by screws 194 and keys 188 which in turn are attached to the guides by screws 189. Antifriction wear plates 190 are secured by screws 191 to angular portions of the guides. These plates require no lubrication, thereby eliminating any lubricant drip into the mass or bale. Bolts 192 fitted with nuts 193 are threaded in the guide means and abut against the side walls of the compress ram in a manner whereby to provide for lateral and vertical alignment of the ram. Gib bars 195 assist in the alignment of the guides and provide support for the top plate 175. Keepers 196 are secured to the top plate 175 and provide back stops for the gib bars. Stud bolts 198 are threaded into the top plate 175 and extend through the gibs 195 and nuts 199 lock the gibs in place.

The platform 64 associated with the secondary press, as illustrated in FIGURES 8, 9 and 10, is vertically movable and is actuated to its uppermost position when receiving a mass being ejected from the primary press. The uppermost position is at the same elevation as the top surface of the bottom wall 70 of the primary press. The platform 64 is adapted to be lowered during a portion of the forward travel of the compress ram 63, and includes a top plate 200 provided with a channel trough 204 running lengthwise thereof. The plate 200 has downturned lips at its ends, as indicated at 201 (one shown) to facilitate mass and/or bale advance and discharge. The trough 204 is preferably cut away as at 202 to provide clearance for a sprocket 203. Support bars 205 are attached to outer extremities of longitudinal sides of the plate 200 and pairs of cross braces 206 are welded to the ends of the structure, while pairs of cross bars 207 of a greater vertical dimension are secured to the structure and connect with members 208. The members 208 are attached to cylinder rods 209 of cylinder means 104 and are slotted to fit about the bars 207. Bolts 210 with nuts 211 extend through aligned holes in the members 208 and bars 207 to firmly secure the platform 64 to the cylinder means. The members 208 fit in bushings 212 which in turn are secured in bored holes provided in the bottom plate 71. The cylinder means 104 are bolted to the bottom plate 71 in aligned relationship to the members 208.

The bale transfer means or assembly 65 includes the power means 106 which is bolted to a bracket 35 by bolts 36 and is fitted with a sprocket 220. The bracket 35 is secured to the bottom plate 71 by welding and carries a bearing 37. A bracket 213 is secured to the plate 71 by bolts 214. Bearings 215 and 216 are secured to end flanges of the bracket 213. A shaft 217 extends through bearings 215, 216 and 35 and carries sprockets 218, 219 and 203. Another bracket with bearings and shaft carrying sprockets similar to 213 (not shown) is secured to an opposite side of the bottom plate 71. A chain 221 engages the sprockets 219 and 220 and provides means for transmitting power from the power means 106 to the shaft 217. A pair of chains 222 and 223 respectively engage the pair of sprockets 218 and 203 and an opposite pair of chains engage another pair of sprockets (not shown). The bars 107 and 108 are carried by the chains. Thus, when the plate 200 is in a depressed or lower position and upon command from the control circuit, the power means 106 will drive the sprockets and chains, advancing the bars in parallel relationship to each other. A plate 105 secured to a cross bar 207 is provided with a trip rod 224 extending through an opening in the bottom plate 71. A bracket 225 is connected to plate 71 and carries a switch LS14 disposed for engagement with the rod 224.

HYDRAULIC CIRCUITRY AND OPERATION

The hydraulic systems or circuitry 62 and 66 as exemplified in FIGURE 17 of the drawing will now be described. The purpose of these systems is to provide fluid power for the rams with sufficient thrust and at such rates of speed as to develop the results desired for efficient compacting or baling and compressing operations and transfer of the mass. The hydraulic systems are under control of electrical circuitry which is so arranged that an electrical control circuit must be energized before most of the hydraulic components function. The circuitry is best described when it is assumed that the rams are in their normal stored position; viz the primary ram is in intermediate forward position with the abutment 93 depressing the switch LS4; the resistance ram 60 is in its full forward position as illustrated in FIGURE 6 with the abutment 96 depressing a switch LS9; the ejector ram 61 is in its retracted position as illustrated in FIGURE 8 with the abutment 99 depressing switches LS1 and LS15; the compress ram 63 is in its retracted position as illustrated in FIGURES 1 and 8, with the abument 103 depressing a switch LS11; the bale platform 200 is in its down full line position as illustrated in FIGURE 10 with the rod 224 depressing a switch LS14; and the bale transfer conveyer chain bar 107, as illustrated in FIGURE 9, is positioned so as to depress the switch LS13. It is also to be assumed that electrical power has been supplied to the electrical circuitry and that all electrical motors except the motor power means 106 are energized. Thus, a vertically adjustable electric eye sensor 400 and a light source 403 are oppositely mounted on the chute 53 and electrically connected to an electric eye control which includes an electrical relay 419 with an adjustable time delay and a beam of light is focused between the sensor 400 and source 403 through chute 53.

Motors 430 and 430' drive variable volume, variable pressure pumps 302 and 302' which draw fluid from a tank or reservoir 300 through filters 301 and 301' and lines 303 and 303'. The fluid passes through a line 305, a check valve 306, a line 307, ports 309 and 312 of a valve 308, thence through a line 313, an oil cooler 314 and to the tank 300. Should oil flow from the pumps be greater than the capacity of the cooler, oil will by-pass from line 313 through check valves 315 and 315'. A dual hydraulic power source is illustrated by prime numbers ranging from 301' to 306'. Check valves 306 and 306' provide for operation of one or the other power source or both at the same time. Lines 304 and 304' return slip oil from the pumps 302 and 302' respectively to tank 300.

When material is delivered to the apparatus through the feed chute 53 it forms a vertical column in the chute rising from the top surface 31 of the ram 59. When the material column builds vertically upward to interrupt or block the light beam, certain electrical controls, to be described later, are energized causing a solenoid B of a valve 308 to be electrically energized shifting a spool thereof to the left, thereby connecting ports 309 and 311 of the valve 308. Simultanesouly a solenoid G of a valve 317 is energized causing ports 318 and 319 of said valve to communicate. Fluid then passing through line 316 flows to the cylinder means 91 through a line 320 and a port 91'. When pressure builds in this line sufficient to actuate a pilot section of check valves 321 and 321', fluid flows from line 316 through ports 318 and 319 of the valve 317 to open valves 321 and 321'. As the piston of the cylinder means 91 is forced leftward by the flow of fluid through the port 91′, fluid will flow from the cap end of cylinder means 91 through a port 91″, a line 322, valve 321′ to the tank 300 and the valve 321, a line 323, a line 325, ports 310 and 312 of the valve 308, line 313 and divided flow to tank 300 via the valves 315 and 315′ and the cooler 314. An adjacent cushion in port 91″, of a standard commercial design, may be adjusted to increase or decrease the speed of deceleration of the retracting piston of the cylinder means 91 for the ram 59. This provides for a variable time delay between the retracting and advancing stroke of this ram, assuring a complete charge of material to fall from the chute 53 into the receiving area 56. When the piston of the cylinder means 91 and the ram 59 are fully retracted as illustrated in FIGURES 6 and 8, the abutment 93 depresses an actuator on the switch LS3 to energize certain electrical relays and cause the solenoid B of valve 308 and the solenoid G of valve 317 to deenergize shifting its spool to connect port 319 with a line 324 and thereby drain pilot pressure fluid from valves 321 and 321′ to the tank 300. Actuation of the switch LS3 also causes the solenoid A of valve 308 to be energized. Fluid flow then is from line 307 through ports 309 and 310 of valve 308, lines 325 and 323, check valve 321, line 322 and port 91″ of the cylinder means 91, thereby advancing the piston of cylinder means 91 and ram 59. As the ram 59 advances, fluid flows from the rod end of the cylinder means 91 through port 91′, lines 320 and 316, ports 311 and 312 of valve 308, line 313 and thence via valves 315 and 315′, and cooler 314 to the tank 300. The advancing ram 59 compresses the charge of material in the receiving area 56 against the resistance ram 60 operated by the cylinder means 94. Compressing the material densifies it, thereby requiring greater thrust which is developed by automatically increasing fluid pressure in the hydraulic circuit. This is obtained primarily by the pumps 302 and 302′. When pump pressure increases to the manually preset pressure of a pair of sequence valves 326 and 326′, pilot fluid passes from line 323, through pilot line 327, a pair of valves 328 and 328′ to the pilot section of the sequence valves 326 and 326′ to respectively open the latter to allow the fluid to flow from line 323 through the sequence valves. The valves 328 and 328′ are manually operable shut-off valves which when closed prevent their respective sequence valves from operating and isolating that portion of the subsequent circuit under its control. This allows for replacement of hydraulic components within said subsequent circuit while the parallel circuit is in operation. Fluid flows from valve 326 through parallel systems via a line 329, a pair of metering valves 330 and 330', a pair of lines 340 and 340′, boosters 341 and 341′, and combines flow in a line 342, thence through a valve 343 to a line 344. A similar parallel system is illustrated between valves 326′ and 343′. The flow then is from lines 344 and 345 to the port 91″ of the cylinder means 91. When material is being compressed into a mass by the ram 59 against the resistance ram 60, fluid pressure is developed in the cylinder means 94 of the resistance ram structure between its piston and cap end 94′. The resistive pressure is regulated by the flow of fluid from the cylinder means 94 as the resistance ram is driven rearwardly by the advancement of the primary ram 59 and the layered mass 21. The resistance ram and the lines and valves operatively connected thereto are such that fluid will flow from the port 94′ of the cylinder means 94 through lines 346, 347 and a flow control valve 348 to a sensing means preferably in the form of a pressure pilot valve 349. The valve 349 is of a type which may be manually adjusted to a desired compression pressure within the limits of the power means or source and density or compactness of the mass. When sufficient fluid pressure is obtained in the cylinder means 91, pilot fluid will flow from the line 322 through a pilot line 350 which opens the valve 349 to allow fluid to flow through this valve, and the line 351 to the tank 300. When the valve 349 opens to drain fluid from the cylinder means 94, the pressure in the cylinder means will drop, thereby reducing the resistive pressure against the mass and the ram 59. The pressure drop in the pilot line 350 serves to close the pilot valve 349. The pumps 302 and 302′ are of the variable volume and variable pressure type and at a given pressure provide the fluid means for operating the booster pumps 341 and 341′ to develop fluid pressure to the preset pressure of the valve 349 as the ram 59 and mass continue to advance forwardly against the resistance ram 60. The functions of these components are organized in a manner whereby to develop a pounding action against the mass during at least a portion of its forward travel to obtain a mass of desired density while sensing the fluid pressure to maintain a substantially uniform baling pressure which will reflect basically uniform density in the compacted material. As the resistance ram 60 is driven rearwardly, fluid is drawn into the rod end 94″ of the cylinder means 94 from the tank 300 through a valve 352 interposed in a line 353 connected to said rod end of the cylinder means.

If the material delivered to the feed chute 53 is sufficient to interrupt the light beam of the electric eye sensors 400 and 403 before the ram 59 completes its forward stroke to cause the abutment 93 to actuate the switch LS4 the baling ram cycle will repeat. However, if the light beam of the electric eye sensors 400 and 403 is not interrupted, the ram 59 will advance to a forward position, causing the abutment 93 to actuate the switch LS4 and deenergize the solenoid A of valve 308 so that the spool of this valve will center, blocking the flow of fluid to or from the cylinder means 91 so that fluid will circulate from the pumps 302 and 302′ through valve 308 and back to the tank 300 via line 313, cooler 314 and valves 315 and 315′.

When the mass has been formed by compression of repeated charges of material to a desired or predetermined condition, such as to size or weight, an elongated adjustable abutment 96 will actuate the bale length control switch LS6. A preadjusted stroke counter 414 may determine the condition as to size or weight of the mass. The setup is such that certain electrical controls energized by either the stroke counter or the switch LS6 cause the ram 59 to advance the compacted mass toward an ejection position while the switch LS6 is overridden by the abutment 96 and the abutment 96 actuates the switch LS8 to effect energization of a solenoid E of a valve 354 to open this valve and allow fluid to freely flow from cap end 94′ of the cylinder means 94 through lines 346, 347 and 355, valve 354, and to the tank 300. The ram 59 thus advances the compacted material a predetermined or final distance without resistance pressure until the switch LS5 is actuated by the abutment 93 on the rod 92 which causes the solenoid A of valve 308 to deenergize and solenoid B of said valve to energize, providing fluid flow from line 307 through valve 308, line 316, valve 354, line 356, pilot operated valve 357, line 353 and rod end port 94″ of the cylinder means 94, whereby to force the resistance ram 60 rearwardly until the abutment 96, on the member 95, actuates the switch LS7 on the member 95′. Through electrical control relays thereby actuated, solenoid E of valve 354 is deenergized causing its valve spool to shift to a blocked center position to stop the resistance ram 60 and the electrical circuit is readied for a solenoid C of a valve 358 to become energized providing: an abutment 103, carried by the compress ram 63, as illustrated in the hydraulic circuit 66 of FIGURE 17, is depressing an actuator of switch LS11; the abutment 99 on the bar 98 which is movable with the ejection ram head 61, is depressing actuators of the switches LS1 and LS15; the light beam of electric eye sensors 421 and 422 located diagonally in the horizontal and vertical planes, as illustrated in FIGURES 2 and 5, is unbroken by an untransferred bale; and that an actuator for the switch LS5 is depressed indicating that the primary ram 59 has not retracted. With all these conditions satisfied, the solenoid C of valve 358 is energized to shift its spool to provide fluid flow from the line 307 through a line 363, ports 359 and 360 of valve 358, a line 364 and a valve 365 interposed therein, a cap end port 97′ of the cylinder means 97, which forces the ejector ram 61 forwardly for pushing the compacted mass laterally and outwardly through an outlet of the elongated chamber 27 onto the bale platform 200. Actuation of the switch LS5 also causes a solenoid K of a valve 394 to be energized, causing its valve spool to shift to communicatively connect port 395 with port 396 and 397 with 398 of said valve. The circuitry in which this valve is located will be described subsequently.

When the ejector ram 61 is advancing, fluid will flow from the rod end 97″ of the cylinder means 97 through a line 366, ports 361 and 362 of the valve 358 to the tank 300. When the abutment 99 on the rod 98 actuates the switch LS2, the solenoid C of valve 358 is deenergized and a solenoid D of this same valve is energized causing its spool to shift and communicatively connect port 360 with the port 362, and 361 with 359 so as to allow fluid flow through line 363, ports 359 and 361, a line 366 to the rod end port 97″ of cylinder means 97 to cause the ejector ram 61 to retract, while fluid is discharged from this cylinder means through its cap end port 97′, line 364, valve 365, ports 360 and 362 of valve 358, to the tank 300. When the abutment 99 on the rod 98 actuates the switches LS1 and LS15 a solenoid D of the valve 358 is deenergized to close this valve, and this energizes a solenoid F of the valve 354 to open diagonal ports whereby to allow fluid flow through lines 307, ports 309 and 311 of valve 308, line 316, valve 354, lines 355, 347 and 346, and cap end port 94′ of the cylinder means 94 to advance or impart motion to the resistance ram 60. As the resistance ram advances fluid is forced through the rod end port 94″, line 353, a valve 357, which has been opened by pilot pressure through a line 367 connected to line 347 and pilot section of the valve 357, a line 356, diagonal ports of the valve 354, and to tank 300. When the resistance ram 60 advances to cause the abutment 96 on the rod 95 to depress an actuator of the switch LS9 prior to dead-heading of the cylinder piston, solenoid G of the valve 317 energizes, opening the valve allowing pilot pressure from the line 316 to operate the pilot sections of valves 321 and 321′, thereby opening these valves. Fluid freely flows from the cap end port 91″ of the cylinder means 91 through line 322 and valve 321′ to tank 300 and through valve 321, lines 323 and 325, ports 310 and 312 of valve 308, line 313 and thence through the cooler 314 and valves 315, 315′ to the tank 300, while fluid flows from line 316 through line 320 and rod end port 91′ of cylinder 91, causing the ram 59 to retract until the abutment 93 depresses an actuator of switch LS4. If at this time the light beam of the electric eye sensors 400 and 403 has not been broken, the solenoid G of the valve 317 will deenergize and the solenoid B of valve 308 will deenergize causing valve spools to shift and the primary ram 59 will stop. If the light beam of the sensors 400 and 403 is broken, solenoid G of valve 317 and B of valve 308 remain energized and a new cycle begins.

After the abutment 99 on the rod 98 has actuated switches LS1 and LS15 on the return stroke of the ejector ram 61, additional electrical controls are energized which causes energization of a solenoid H of a valve 368 whereby to shift its spool to communicate the port 369 with 370 and 371 with 372.

Motors 500 and 500′ of the hydraulic system 66 drive constant volume, constant pressure pumps 375 and 375′ which draw fluid from the tank 373 through filters 374 and 374′ and lines 376 and lines 376′ respectively. Fluid from the pump 375 is pumped through lines 377 and 378, a valve 379, and lines 380 and 381. An unloading valve 382 is connected to line 377 and serves to unload the fluid delivery from pump 375 to a tank 373 on the retracting stroke of the compress ram 63. The pump 375′ is a parallel power source to pump 375 and may operate cooperatively or singly as desired to deliver fluid to a line 378′, a valve 379′, and to lines 384 and 381. A manually operable valve 385, connected with an extension of line 384, provides for reading the fluid pressure in the system on a gauge 386. The motor or motors operate continuously, therefore an open centered spool in the valve 368 allows for fluid flow from line 381 through ports 369 and 372, a check valve 387 to the tank 373 when solenoids H and J of the valve 368 are deenergized. A relief valve 388 is connected to the line 381 which drains to tank 373 should excessive pressure be developed in the system by the pumps. Fluid also flows from a line 380 through a valve 389 (provided with a drain line to tank 373), a valve 390, and lines 392 and 393. Associated with the line 392 is an accumulator 391 which stores fluid at a pressure determined by the preset pressure adjustment of the valve 389 and is locked in the line 392 between valve 390 and valve 394 whose closed center spool blocks a port 395 of the latter valve. A valve 385′ is manually operable to obtain a visual pressure reading on a gauge 386′ of the fluid in the line 392.

When the switch LS7 is actuated by the resistance ram 60 of the primary press 20, an electrical circuit is cocked whereby when other conditions are in programmed sequence the solenoid K of valve 394 is energized causing its spool to shift, communicating port 395 with 396 and 397 with 398, thereby allowing fluid stored in the accumulator 391 to flow through ports 395 and 396 of this valve, a line 399, lines 600 and 601 to the cap end ports of the cylinder means 104 operatively associated with the platform 64. This elevates the platform 200 in alignment with the bottom wall 70 of the primary press. When the cylinder means 104 are elevating the platform 200, fluid from the rod end of these cylinder means flows through a line 602, ports 397 and 398 of the valve 394, and a valve 603 to the tank 373.

When the switches LS1 and LS15 have been actuated on the return stroke of the ejector ram 61 of the primary press 20, the solenoid H of the valve 368 is energized causing its spool to shift to communicate port 369 with 370 and 371 with 372 of the valve, thereby allowing fluid to flow from the line 381 through ports 369 and 370 of valve 368, lines 604 and 605 to the cap end port 101′ of the cylinder means 101, a line 606, a valve 607 interposed in the line 606, a port 74′ of the cylinder means 74, and a line 608 to the cap end port 102′ of the cylinder means 102. This forces the cylinder rods of the cylinder means 101, 74 and 102 outwardly to advance the compress ram 63 and force fluid from the rod end 101″ of cylinder means 101 through a line 609, and fluid from the rod end 102″ of cylinder means 102 through a line 611. The combined flow from lines 609 and 611 passes through a line 610, the ports 371 and 372 of the valve 368, valve 387 and to the tank 373. As the compress ram 63 advances, a preset adjustable abutment 103 associated with the structure of said ram depresses an actuator on switch LS12 and solenoid H of valve 368 deenergizes causing its spool to shift to the closed position, thereby stopping the ram 63 and other electrical controls are actuated whereby the solenoid K of the valve 394 is deenergized and solenoid L of said valve is energized shifting its spool to communicate port 395 with 397 causing fluid to flow from the line 392 through ports 395 and 397 of the valves 394, and the line 602 to the rod ends of the cylinder means 104, thereby lowering the platform 200 and causing the switch LS14 actuator to be depressed. The solenoid L of the valve 394 is deenergized causing its spool to center and the solenoid H of valve 368 is reenergized causing the ram 63 to continue its forward travel. When the abutment 103 depresses an actuator on the switch LS10, the solenoid H of valve 368 is deenergized, whereas the solenoid J of valve 368 is energized shifting its spool to communicate its ports 369 and 371. Fluid then passes from the line 381 through ports 369 and 371 of the valve 368, the line 610 and thence through parallel lines 609 and 611 to the ports 101″ of the cylinder means 101 and ports 102″ of the cylinder means 102, respectively, thereby causing the cylinder rods and ram 63 to be withdrawn. Fluid pressure in a pilot line 612, operates the valve 382, opening it and causing the flow from the pump 375 to by-pass through line 377, valve 382 to the tank 373 when both pumps are operating. This controls the speed of the ram 63 on its reverse stroke. When the pump 375 is operating alone, a valve 613 in the pilot line 612 must be closed. As fluid pressure builds up on the rod ends of the cylinder means 101 and 102, pressure of the fluid in the line 609 causes pressure in the pilot lines 612 and 613 which causes the pilot section of the valve 607 and a valve 614 to actuate by fluid flowing from line 609 through a valve 615, and lines 612 and 613. An extension of the line 613 is connected to a relief valve 616 to control pressure in lines 612 and 613 by allowing fluid flow through valve 616 to tank 373. As the cylinder rods retract, fluid flows from the cap end 101′ of the cylinder means 101 through line 605 to line 604, from the cap end 102′ of the cylinder means 102 through line 608 to line 604, from port 74′ of the cylinder means 74 through the valve 607, and lines 606 and 604. The combined flow in line 604 passes through ports 370 and 372 of valve 368, valve 387 of valve 368 and to the tank 373. Fluid also passes from port 74″ through valve 614 and to the tank 373. Should the switch LS10 be prelocated in advance of a preset pressure of the hydraulic system as set on a pressure switch 617 connected to line 606, such pressure being developed by the density of the compressed mass, certain electrical controls will be actuated causing deenergization of the solenoid H of valve 368 and energization of the solenoid J. It is obvious, therefore, that a dual control is incorporated for fail-safe operations. The ram 63, and its cylinder rods, retract until the abutment 103 depresses an actuator on the switch LS11 which causes the solenoid J of the valve 368 to deenergize allowing its spool to center and the ram 63 stops completing a cycle.

ELECTRICAL CIRCUITRY AND OPERATION

The electrical system or circuits, as exemplified in FIGURES 18, 19, 20 and 21, will now be described. The purpose of this circuitry is to provide primary electrical power to the control circuit whereby the motors may be started by standard remote methods not disclosed and the control circuit may be energized by reduced voltage power. The control circuitry is interconnected so as to provide the sequence of operations necessary for the equipment to function or operate as one programmed integrated unit either automatically or manually. The primary and secondary presses may be operated as a system in unison automatically; the primary or low density press may be operated automatically and independent of the secondary or high density press; the low density and/or the high density presses may be operated manually independently with safety interlocks always in command.

Primary power supplied by the purchaser is adapted for connection to a switch 16. A two-conductor connection is made on the downstream side of the switch 16 across which a pilot light 406 is connected to visually indicate when the switch is closed and primary power is available to the control circuit. Each conductor passes through a fuse referred to as F1 and F2 before being connected to a reducing voltage transformer 408 which provides reduced voltage power for all controls hereinafter referred to. A conductor 1 from the low voltage side of the transformer may be considered as a common conductor. Another conductor 410 is connected to the transformer 408 and a fuse F3 is interposed in this conductor on the upstream side of a control switch 17.

The switch 17 is shown in the "OFF" position and all electrical controls are shown in their respective deenergized positions with all mechanisms in their normal stored positions. When the switch 17 is manually turned to the "ON" position, current will be conducted to that portion of the circuit connecting to conductors 416 and 404. More specifically, current will be conducted through a conductor 416 to an indicating light or signal P1 and then to the conductor 1. Current also flows through a conductor 418 through the electric eye control relay 419, which controls the primary press baling ram 59 operation, to conductor 1, and through the electric eye control relay 420, which controls in part operations of the ejector means 61 and certain other operations to be described subsequently, and to conductor 1. Current to the electric eye light source 403 is received from the relay 419 and passes to conductor 1, while current to the electric eye light source 421 is received from the relay 420 and passes to conductor 1. Current further flows from conductor 416 through closed contacts of switches PB11, PB13, PB15, PB17, PB19, PB21 and closed contacts of multiple contact selector switch 422, pilot light 439 to indicate that switch 422 is in its NORMAL position and to conductor 1. In the NORMAL position of switch 422 current passes through to conductor 404 through closed contacts 440a of a multiple contact switch 440, pilot light 3 to indicate that power is available to the subsequent automatic cycling circuit, and to conductor 1.

Turning the switch 17 to the ON position passes current from conductor 416 and when switch PB12 is closed current flows from conductor 416 through switch PB11, switch PB12, coil 230c of relay 230 to conductor 1 to close the contact 230a of relay 230 and form a sealing circuit around switch PB12 to coil 230c of relay 230, as well as conduct current through pilot light 5 to conductor 1, whereby motor 430 of pump 302 will be energized. When switch PB14 is closed, current will flow from conductor 416 through switch PB13, switch PB14, coil 231c of relay 231 to conductor 1 to close contact 231a of relay 231 to form a sealing circuit around switch PB14 to coil 231c of relay 231, as well as through pilot light 6 to conductor 1, whereby motor 430′ of pump 302′ will be energized. When switch PB16 is closed, current flows from conductor 416 through switch PB15, switch PB16, coil 232c of relay 232 to conductor 1 to close contact 232a of relay 232 to form a sealing circuit around switch PB16 to coil 232c of relay 232, and through pilot light P7 to condctor 1, whereby motor 114 of exhauster 113 will be energized. When switch PB18 is closed, current flows from conductor 416 through switches PB17, and PB18, coil 233c of relay 233 to conductor 1 to close contact 233a of relay 233 and form a sealing circuit around switch PB18 to coil 233c of relay 233 as well as through pilot light P8 to conductor 1, whereby motor of cooler 314 will be energized. When switch PB20 is closed, current flows from conductor 416 through switch PB19, switch PB20, coil 234c of relay 234 to conductor 1 to close contact 234a of relay 234 and form a sealing circuit around switch PB20 to coil 234c of relay 234, as well as through pilot light 9 to conductor 1, whereby motor 500 to pump 375 will be energized. When switch PB22 is closed, current flows from conductor 416 through switch PB21, coil 235c of relay 235 to conductor 1 to close contact 235a of relay 235 to form a sealing circuit around switch PB22 to coil 235c of relay 235, as well as through pilot light 10 to conductor 1, whereby motor 500′ of pump 375′ will be energized.

Contact 236b of relay 236 connected to conductor 416 will be closed automatically upon energization of coil 236c of relay 236 at a subsequent time in the programmed circuit, whereby current passes from conductor 416 through contact 236b, coil 237c of relay 237 to conductor 1 to cause bale transfer conveyor motor 106 to be energized with the chain of the transfer means 65 moving forwardly. Also, current will flow through pilot light P11 to indicate when the bale transfer means 65 chain is operating and to conduct 1. A conductor 40 connected to the downstream side of contact 236b connects with contact 18a of switch 18 the operation of which will be described subsequently.

The selector switch 422 allows for NORMAL programmed sequencing of a portion of the control circuit as well as MANUAL JOG of parts of the control circuit. When switch 422 is positioned in the NORMAL position current flows from conductor 416 through closed contacts 422c of switch 422 to line 404 and through the closed contact 440a of switch 440, and pilot light 3 to conductor 1. When pilot light 3 is lit it indicates that the switch 440 is in the OFF position. The circuit developed when switch 422 is turned to the MANUAL JOG position will be described subsequently. When the switch 440 is turned to PRIMARY PRESS position the contact 440c is closed to form a circuit from conductor 404, through contact 440c, pilot light 2 and the conductor 1 and a conductor from the upstream side of pilot light 2 connects to coil 238c of relay 238 and conductor 1. Energization of the coil 238c of relay 238 conditions circuitry required for operation of the mass ejection from the primary press. A second contact 440d of switch 440 closes providing a circuit between conductor 404 and conductor 8 to energize the primary press remaining NORMAL control circuit hereinafter described. Turning the switch 440 to the PRIMARY AND SECONDARY PRESSES position closes contact 440b forming a circuit from conductor 404 through contact 440b, pilot light 4 to conductor 1, and again through contact 440d to conductor 8 to energize the primary press remaining automatic control circuit, and also close contact 440e to energize the secondary press NORMAL automatic control circuit through conductor 7.

Since one of the objects of the invention is primarily for obtaining a product developed by the full capability of the equipment and produced automatically, the automatic operation of the entire system will be described initially. When the switch 440 is turned to the PRIMARY AND SECONDARY PRESSES position, providing current to conductor 7 through contact 440e, contact 425a of switch 425 when in AUTOMATIC position, contact 239e of relay 239, fuse F426, contact LS11a of switch LS11, contact 239f of relay 239, coil 240c of relay 240 to conductor 1, thereby establishing a further circuit from conductor 7 through contact 425a of switch 425, contact 240a of relay 240, contact 241hh of relay 241, coil 242c of relay 242 and pilot light 12 which indicates power available to the automatic circuit of the secondary press and that said press ram is in normal stored position, to conductor 1. A sealing circuit for switch LS11 is established from conductor 7 through contact 425a of switch 425, contact 242jj or relay 242, contact 241hh of relay 241, coil 242c of relay 242 to conductor 1 thereby connecting the control circuit of the primary press to the control circuit of the secondary press through contact 242aa, 242bb and 242c'c' of control relay 242. In this manner, the primary press may be operated without the secondary press operating and the secondary press may be operated manually while the primary press is operating automatically during mass formation.

When the primary ram 59 is in an intermediate position, the abutment 93 operates switch LS4 closing its contact LS4a. If the material flowing through the chute 53 breaks the beam of light from the light source 403 of relay 419, contact 419a of the electric eye relay 419 closes to establish a circuit whereby current will flow through the conductor 8, fuse F407, contact LS4a of switch LS4, contact 419a of relay 419, contact 243a of relay 243, contact 244a of relay 244, coil 245c of relay 245, contact LS3a of switch LS3 to conductor 1. Energizing coil 245c of relay 245 establishes a sealing circuit between conductors 8 and 1, through contact 245c' of relay 245, conductor 11, contact 244a of relay 244, coil 245c of relay 245, contact LS3a of switch LS3 to conductor 1. This provides an operating circuit from conductor 8 through contact 245c' of relay 245, contact 245d of relay 245, contact 247a of relay 247, fuse F409, solenoid B of valve 308 to conductor 1 and to pilot light 411 which indicates that the primary ram 59 is retracting, and to conductor 1. Energization of solenoid B of valve 308 causes valve spool to shift and oil to flow for driving primary ram 59 rearwardly. At the same time a circuit is established through contact 245a of relay 245, contact 246a of relay 246, latch coil 246c of relay 246 to conductor 1. This establishes a circuit through contact 246b of relay 246, program progress pilot light or signal 445 indicating baling ram operation, and to conductor 1. Another circuit is established from conductor 8, through contact 245c' of relay 245, conductor 11, contact 245e of relay 245, conductor 169A, contact 247e of relay 247, fuse F412, solenoid G of valve 317 to conductor 1. This causes spool of valve 317 to shift allowing fluid flow from the cap end 91″ of cylinder 91. The primary ram 59 continues its rearward motion until abutment 93 actuates switch LS3, opening contact LS3a which deenergizes coil 245c of relay 245, opening contacts 245a, 245c', 245d and 245e of the circuit to deenergize solenoid B of valve 308 and solenoid G of valve 317 shifting their spools to normal stored positions.

When the switch LS3 was operated, a circuit was established from conductor 8 through contact LS5a of switch LS5, contact LS4b of switch LS4, fuse F413, contact LS3b of switch LS3, contact 245f of relay 245, coil 244c of relay 244 and to conductor 1. A sealing circuit for the above relay 244 is formed around contact LS3b of switch LS3 from conductor 8 through contact LS5a of switch LS5, contact LS4b of switch LS4, contact 244c' of relay 244, contact 245f of relay 245, coil 244c of relay 244 to conductor 1. Energizing coil 244c of relay 244 establishes a circuit from conductor 8 through contact LS5a of switch LS5, contact LS4b of switch LS4, contact 244c' of relay 244, contact 247d of relay 247, fuse F423, solenoid A of valve 308 and through pilot light 441 indicating primary ram 59 is advancing, and to conductor 1. This circuitry causes spool of valve 308 to shift whereby the primary ram 59 will advance. Also, a circuit is established from conductor 8 through contact 244b of relay 244, contact 415b of push button switch PB415, count coil 414c of relay 414 to conductor 1 causing the counter 414 to register one stroke. Should the predetermined size of the mass vary due to variations of the material supplied, or should a reduced size of formed mass be required or desired, the count of stroke counter can be reduced or counted out by manually actuating switch PB415. This conditions the electrical circuitry for the next programmed operation preparatory to ejection of the mass. To accomplish this a circuit is formed from conductor 8 through contact 415a, count coil 414c to conductor 1. The ram 59 continues its forward travel until abutment 93 depresses actuator on switch LS4 opening contact LS4b to deenergize its circuit containing coil 244c of relay 244, opening contact 244c', which causes solenoid A of valve 308 to deenergize thereby shifting valve 308 spool to center position to stop further forward travel of the primary ram 59. When contact LS4b of switch LS4 is opened, contact LS4a of switch LS4 is closed and a circuit is readied to repeat the cycle when contact 419a of electric eye relay 419 has its beam of light interrupted.

The above sequence of operations will repeat automatically until a mass has been made to a predetermined condition or size as determined by a mass length control switch LS6 or the stroke counter 414. These conditions or size controls function by circuits established as follows: On the last forward stroke of the primary ram 59 the resistance ram 60 having been forced rearwardly as previously described, causes the abutment 96 on a bar 95 associated with said resistance ram to depress an actuator on the switch LS6, thereby closing contact LS6a of said switch to establish a circuit from conductor 8 through fuse F417, contact LS6a of switch LS6, contact 249a of relay 249, latch coil 249c of relay 249 to conductor 1. Energizing coil 249c of relay 249, closes contact 249b in the circuit from conductor 8 through contact LS5a of switch LS5, contact 249b of relay 249, contact 244c' of relay 244, contact 247d of relay 247, fuse F423, solenoid A of valve 308 to conductor 1; or establishes a circuit from conductor 8 through contact LS5a of switch LS5, contact 414a of stroke counter 414, contact 244c' of relay 244, contact 247d of relay 247, fuse F423, solenoid A of valve 308 to conductor 1. By closing contacts 249b of relay 249 or contact 414a of the counter relay 414 a by-pass circuit is established around the contact LS4b of switch LS4. These circuits are extensions of the programmed circuitry causing the start of the mass ejection cycle. Then as the abutment 93 overrides the actuator of switch LS4 the sealing circuit established by either contact 249b or contact 414a causes the ram 59 to advance past or beyond its normal forward position and the ram continues its forward travel advancing the mass toward the ejection position. While the primary ram 59 and its associated abutment 93 are in forward motion and in some position between the switches LS3 and LS5, the abutment 96 associated with the resistance ram 60 will cause actuation of the switch LS8, thereby establishing a circuit from conductor 8 through contact LS7a of switch LS7, contact 243b of relay 243, contact 250b of relay 250, fuse F424, solenoid E of valve 354 and pilot light 442 indicating the resistance ram retraction, contact 250d of relay 250, fuse F427, contact LS8a of switch LS8, contact 249c' of relay 249 which was closed when coil 249c of relay 249 was previously energized, to conductor 1. Energizing solenoid E of valve 354 shifts the valve spool whereby resistance pressure can be released from the mass during some preset or predetermined variable distance during at least a portion of the forward travel of the primary ram 59 and mass depending upon the condition of the mass.

The primary ram 59 advances until the abutment 93 actuates the switch LS5 to open contact LS5a to deenergize a circuit containing coil 244c of relay 244 and open contact 244c' which causes solenoid A of valve 308 to deenergize thereby shifting its spool to stop forward travel of the primary ram 59 and locate its forward face plate 174 at least flush with the guide plate 165. The resistance ram 60 is pushed rearwardly during the operation to satisfy conditions to enable ejection of the mass or bale without conflicting with subsequent operations of the system.

When fluid is directed to the rod end 94" of the cylinder means 94, the resistance ram 60 is separated from the forward face of the mass by moving it at high speed positively out of the ejection chamber to a fully retracted position so that it will be clear of the ejection ram. This is achieved by an electrical circuit which is established from conductor 8 through contact LS5b of switch LS5, contact 251a of relay 251, contact 244d of relay 244, contact 245b of relay 245, contact 247a of relay 247, fuse F409, solenoid B of valve 308 to conductor 1. This causes the spool of valve 308 to shift providing full pump pressure and fluid flow to the fluid circuits serving the rod end 91' of cylinder 91, the ejector cylinder means 97 and the resistance cylinder means 94 in their forward and reverse directions. The solenoid B of valve 308 remains energized until abutment 96 actuates the switch LS9 on the forward stroke of the resistance ram 60 near the conclusion of the ejection cycle as will be described subsequently.

When the abutment 96 actuates the switch LS7, a contact LS7a of this switch is opened breaking the continuity of the circuit whereby solenoid E of valve 354 is deenergized causing its spool to shift to a blocked position. When contact 242aa of relay 242 was closed as previously described, conductor 34 became an extension of conductor 8. Also when switch LS5 was actuated to close its contact LS5d a circuit was established from conductor 34 to conductor 35A and through program progress light or signal 437 indicating that the primary ram 59 is in full stroke forward position, to conductor 41, contact 255c' of relay 255, contact 242bb of relay 242, fuse F427, contact LS8a of switch LS8, contact 249c' of relay 249 to conductor 1. Actuation of the switch LS7 also establishes a circuit from conductor 8 through contact LS7b of switch LS7, program progress light or signal 438 indicating that the resistance ram 60 is fully retracted, to conductor 193A, through contact 242c'c' of relay 242 to conductor 1.

An initial circuit for the operation of the ejector ram 61 is established from conductor 35A through contact 243c' of relay 243, contact LS1a of switch LS1, contact 420a of electric eye relay 420, closed only when the beam of light between lamp 421 and receiver 422 is unbroken by any obstruction in a chamber of the secondary press 22, contact 253a of relay 253, coil 254c of relay 254, fuse F428, contact LS2a of switch LS2, contact 255c' of relay 255 to conductor 41. Relay 254 is sealed in by contact 254a closing to by-pass contacts LS1a of switch LS1 and 420a of relay 420. An additional circuit is made from conductor 35A through contacts 243c' of relay 243, contacts 254a and 254b of relay 254, 247g of relay 247, contact LS11b of switch LS11, contact LS7c of switch LS7, contact 247h of relay 247, contact LS13a of switch LS13, fuse F429, solenoid C of valve 358 and program progress pilot light 431 indicating that the ejector ram 61 is advancing, to conductor 41. Energizing solenoid C of valve 358 causes its spool to shift and allow fluid flow to the cap end 97' of cylinder 97 and provides for the forward actuation of the ejector ram 61, thereby ejecting the mass from the primary press. At the same time relay 254 is energized, a circuit is made from conductor 8 through contact LS7b, contact 254c' of relay 254, contact 256a of relay 256, latch coil 256c to conductor 193A. This closes contact 256b of relay 256, program progress light 15 indicating that the ejector ram is moving, to conductor 41. The organization of this circuitry is to provide an automatic, programmed, sequential, non-conflicting, interlocked mode of mass ejection.

The conditions of the secondary press to receive the mass will now be described. When the abutment 99 actuates the switch LS2 the coil 254c of relay 254 is deenergized opening its contacts 254a and 254b to deenergize solenoids C of valve 358 to shift its spool to stop the advancement of the ejector ram 61. A second set of contacts LS2b of switch LS2 were closed by actuating switch LS2 to establish a circuit for conductor 35A through contacts LS2b of switch LS2, contacts 254e of relay 254, coil 253c of relay 253, fuse F431, contact LS1b of switch LS1 to conductor 41 and a sealing circuit around contact LS2b of switch LS2 by contact 253b of relay 253. This sets up a circuit from conductor 35A through contact 253b and 253c' of relay 253, contacts 255b of relay 255, fuse F432, solenoid D of valve 358 and pilot light 444 indicating retraction of the ejector ram, to conductor 41 whereby the spool of valve 358 will shift to allow fluid flow to the rod end 97" of cylinder 97 which in turn retracts the ejector ram 61. Concurrently, another circuit is made from conductor 35A through contacts 253e of relay 253, contact 243g of relay 243, latch coil 243c of relay 243, to conductor 193A preparing a circuit for the subsequent advance of the resistance ram 60. When the switch LS1 is actuated by abutment 99 upon the full return stroke of the ejector ram 61, contact LS1b opens breaking the continuity of the circuit to deenergize coil 253c of relay 253 and open contacts 253b and 253c' to deenergize solenoid D of valve 358 to cause its spool to center and stop the ejector ram 61.

The resistance ram 60 will advance rapidly when a circuit is made from conductor 34 through contacts LS4c of switch LS4, contacts 255f of relay 255, contact LS1c of switch LS1, contact 255g of relay 255, contact 243d of relay 243, contact 254f of relay 254, contact 250a of relay 250, fuse F436, solenoid F of valve 354 and pilot light 433 indicating advancement of the resistance ram 60, contact 250c' of relay 250 to conductor 193A. Energizing solenoid F of valve 354 causes its spool to shift providing fluid flow to cap end 94' of cylinder 94 thereby advancing resistance ram 60. When the abutment 96 actuates the switch LS9, a circuit is made from conductor 34 through contacts LS4c of switch LS4, contacts 255f of relay 255, contacts LS1c of switch LS1, contacts 255g of relay 255, contacts 243e of relay 243, conductor 435, fuse F434, contact LS9a of switch LS9, coil 251c of relay 251 to conductor 193A. A sealing circuit around contact LS9a of switch LS9 is made by contact 251d of relay 251. Also from conductor 435 current flows through contact 251b of relay 251, conductor 169A, contact 237e of relay 247, fuse F412, solenoid G of valve 317 to conductor 1 whereby the spool of valve 317 shifts opening said valve to allow the primary ram 59 to retract as fluid is delivered to rod end 91' of cylinder 91 while the resistance ram 60 advances to its fully extended position. At the time when switch LS9 is actuated a unique parallel circuit to solenoid B of valve 308 is made from conductor 34 through contact LS4c, contact 255f of relay 255, contact LS1c of switch LS1, contact 255 g of relay 255, contact 243d of relay 243, contact 251c' of relay 251, contact 244d of relay 244, contact 245b of relay 245, contact 247a of relay 247, fuse F409, solenoid B of valve 308 to conductor 1 to form a sealing circuit around contact LS5b of switch LS5 and remains energized to keep solenoid B of valve 308 energized for that portion of the cycle that the primary ram 59 is in its full forward position with switch LS5 actuator depressed and until said ram retracts and actuates switch LS4 after actuation of switch LS9 by the forward travel of resistance ram 60.

This organization of electrical controls and hydraulic circuitry provides for a rapid advance of the resistance ram 60 until it approaches the primary ram 59, then the resistance ram advances slowly to the end of its stroke while the primary ram 59 retracts. At the time of switch LS9 actuation near the end of the resistance ram stroke a further circuit is made from conductor 8 through contact 251e of relay 251, contacts 249e and unlatch coil 249cc of relay 249 to conductor 1 whereby the mass length control circuit is reset and readied for a repeat cycle. Another circuit is made from conductor 435 through contact 256d of relay 256, unlatching coil 256cc of relay 256 to conductor 193A deenergizing program progress light or signal 15. A further circuit is made from conductor 435 through contact 246d of relay 246, unlatching coil 246cc of relay 246 to conductor 1 to deenergize program progress light or signal 445. Another circuit is made from conductor 435 through counter clutch coil 414cc of relay 414 which resets the counter to the predetermined count setting, to conductor 1.

The primary ram 59 continues retracting until the abutment 93 actuates the switch LS4 to cause contact LS4c of switch LS4 to open, breaking the continuity of a circuit deenergizing solenoid F of valve 354 to cause its spool to shift to a blocked position and thereby stop the resistance ram 60. An additional circuit is made from conductor 34 through contact LS4d of switch LS4, contact 243f of relay 243, unlatch coil 243cc of relay 243 to conductor 193A to deenergize solenoid G of valve 317 to prevent further retraction of the primary ram and deenergize solenoid B of valve 308 and F of valve 354 causing their spools to center and terminate a mass forming cycle. Thus, an initial circuit is readied for the retraction of the primary ram 59 from its normal stored position at the beginning of a new mass forming cycle of the primary press. The entire electrical circuitry, hydraulic circuitry and mechanical components of the primary press has thus been returned to a position preparatory to the formation of another mass. If material is available, the previously described total operation is repeated automatically. Manual controls, to be described subsequently, provide for predetermined, safe, selective manipulation of the functions.

The arrangement is such that the mass may be ejected from the primary press automatically and manually transferred out of the secondary press without going through the compress cycle of the secondary press. This is accomplished by turning switch 440 to the PRIMARY PRESS position thereby establishing the following circuits. From conductor 404 current passes through 440c of switch 440, to pilot light 2 and to coil 238c of relay 238 to conductor 1. A concurrent circuit is made from conductor 404 through 440d of switch 440 to the mass forming portion of the automatic circuit of the primary press. Energization of the relay 238 closes contacts 238a, 238b, 238c' of this relay. This connects the mass-ejection portion of the primary press automatic cycle to the mass-forming portion of said press cycle without connection to the secondary press automatic cycle. The mass can be transferred through the secondary press by manual actuation of switch 18 to establish circuitry which will be described subsequently.

When the switch 440 is in the Primary and Secondary Press position and switch 425 is in AUTOMATIC position and the secondary press ram 63 is in the retracted position with abutment 103 actuating the switch LS11 the secondary press may be automatically operated.

When the conductor 7 is energized a circuit is made between conductor 7, contact 260a of relay 260, contact 239b of relay 239, fuse F446, solenoid L of valve 394 and conductor 1. Energizing the solenoid L causes the spool of valve 394 to shift allowing fluid flow to the rod ends of cylinders 104 thereby lowering the platform 200 to position it in its normal stored position. Also, when relay 254 was energized to advance the ejector ram 61 a circuit was made from conductor 7 through contact 254d of relay 254, contact 260b of relay 260, latch coil 260c of relay 260 to conductor 1, making a circuit from conductor 7 through contact 260' of relay 260, fuse F447, solenoid K of valve 394 to conductor 1 thereby raising the platform 200 preparatory to receiving a mass being ejected from the primary press. A circuit was next made, when relay 253 was energized to retract the ejector ram 61, from conductor 7 through contact 253f of relay 253, contact 240b of relay 240, contact 260d of relay 260, contact 261a of relay 261, contact 262c' of relay 262, latch coil 262c of relay 262 to conductor 1. An initial circuit is established to monitor the operation of bale platform 200 from conductor 7 through fuse F415, contact LS12a and LS12b of switch LS12, coil 263c of relay 263, to conductor 1, thereby closing contact 263a of relay 263.

When relay 262 was energized a circuit was made from conductor 7 through contact 262b of relay 262, contact LS10a of switch LS10, contact 617a of pressure switch 617, contact 250g of relay 250, contact 263a of relay 263, contact 250h of relay 250, fuse F468, contact LS15a of switch LS15, contact 264a of relay 264, contact 265a of relay 265, contact 264f of relay 264, fuse F449, solenoid H of valve 368 and pilot light 450, indicating advancement of ram 63, contact 266a and latch coil 266c of relay 266, to conductor 1. Energizing solenoid H of valve 368, causes its spool to shift allowing fluid flow to cap ends 102', 101' and 74' of cylinders 102, 101 and 74, respectively driving the ram 63 forwardly. Program progress pilot light 451, indicating operation of the compress ram 63, is lit when contact 266b of relay 266 is closed. As the compress ram 63 and its associated abutment 103 advances, clamping the mass between the face plate 174' and the ram face plate 173, the switch LS12 is actuated by abutment 103 whereby to open contact 263a to break the circuit and deenergize solenoid H of valve 368, shifting its spool to interrupt the fluid flow and stop the advancement of the ram 63 until the platform 200 is lowered.

When the switch LS12 is was actuated contacts LS12a and LS12b were opened, deenergizing the relay 263, closing contact 263b to unlatch relay 260 by forming a circuit from conductor 7 through contact 263b of relay 263, contact 260e of relay 260, unlatch coil 260cc of relay 260 to conductor 1. Unlatching of the relay 260 opens contacts 260c' of relay 260 to deenergize solenoid K of valve 394, and energizes solenoid L of valve 394, thereby causing its spool to shift allowing fluid flow to the rod ends of cylinders 104 to cause lowering of the platform 200. The trip rod 224 on the plate 105 actuates the switch LS14 when the platform is fully lowered, leaving the bale clamped and suspended. The arrangement is such that the platform 200 is below the ram 63 whereby to allow the ram 63 to travel over the platform when it is advancing beyond its clamping position.

Actuation of the switch LS14 reestablishes the circuit containing solenoid H by completing the circuit through fuse F448 and contact LS14a, thereby by-passing contact 263a of relay 263 and allowing the ram 63 to resume its forward travel to recompact the mass to obtain a bale of greater density. The advancement of ram 63 may be stopped when the abutment 103 actuates the switch LS10 or by preadjusted fluid pressure actuating pressure switch 617, so the bale can be compressed to a predetermined size or density. Also, these two switches may be arranged so that each is a fail-safe back-up of the other. These factors are important as they offer advantages with respect to adjustments as to the various types of pulp or material being utilized, its moisture content, structural characteristics, density and size desired.

Actuation of the switch LS10, closes contact LS10b, or operation of switch 617 closes contact 617b to energize conductor 452 from conductor 7. A continuing circuit is made from 452 through contact 262d of relay 262, unlatch coil 262cc of relay 262 to conductor 1 opening the contact 262b to deenergize solenoid H of valve 368 causing its spool to center and thereby stop fluid flow to cylinders 101, 102 and 74, and motion of the ram 63. A second circuit is made from conductor 452 through contact 262a of relay 262, contact 261c' of relay 261, latch coil 261c of relay 261 to conductor 1, closing contact 261b of relay 261 in a circuit to energize solenoid J of valve 368. This circuit is made from conductor 7 through contact 240c' of relay 240, 261b of relay 261, 264g of relay 264, fuse F453, solenoid J of valve 368 and pilot light 454, indicating ram 63 is retracting, to conductor 1. Energizing solenoid J of valve 368 causes its spool to shift allowing fluid flow to rod ends 101″ and 102″ of cylinders 101 and 102, respectively, whereby ram 63 will retract. When the ram 63 is fully retracted the abutment 103 actuates the switch LS11 to close contact LS11a and reestablishing a circuit from conductor 7 through contact 425a of switch 425, contact 239e of relay 239, fuse F426, contact LS11a of switch LS11, contact 239f of relay 239, and coil 240c of relay 240 to conductor 1 thereby closing contact 240d of relay 240 to form a circuit from conductor 7 through contact 240d of relay 240, contact 261d of relay 261, unlatch coil 261cc of relay 269 to conductor 1 to open contact 261b of relay 261 whereby to deenergize solenoid J of valve 368 and cause its spool to shift to center position and thereby stop the ram 63.

A circuit is completed from conductor 7 through contact 263c' of relay 263, permissive contacts 455 and 456, contact 261e of relay 261, contact 262e of relay 262, coil 236c to conductor 1 only after ram 63 and its associated abutment 103 has traveled rearwardly a distance to unclamp the bale allowing the bale to drop onto the platform plate 200 and the abutment has cleared the switch LS12, and contacts 455 and 456 are closed only after conditions have been satisfied that a previous bale has cleared the jurisdiction of this baling operation to allow for bale transfer while the ram 63 is still retracting. If desired, equipment not shown may be connected to the permissive contacts 455 and 456 for controlling the operation of the circuit just described. Energizing coil 236c of relay 236 closes contact 236b of this relay in a circuit previously described whereby the power means 106 starts driving the chain 222 and its bars 107 of the bale transfer means 65 to push the bale out of the secondary press. When the coil 236c of relay 236 was energized a circuit in parallel with this relay was made through contact 265b of relay 265 and latch coil 265c of relay 265 to conductor 1 setting up a circuit to assure a complete cycle of the bale transfer chain 222. This is further accomplished by establishing a sealing circuit after trip plate 109 on the bar 107 has moved off the switch LS13 from conductor 7 through fuse 457, contact LS13c of switch LS13, contact 236a of relay 236, coil 236c of relay 236 to conductor 1. When the conveyor chain 222 has completed its cycle, trip plate 109 trips switch LS13 opening its contact LS13c to deenergize coil 236c of relay 236 which in turn opens contact 236b of the relay 236 and the power means 106 stops. When relay 236 was deenergized an additional circuit was made from conductor 7 through contact 236f of relay 236, 264c' of relay 264, contact LS13b of switch LS13, contact 264d of relay 264, contact 265c' of relay 265, unlatch coil 265cc of relay 265 to conductor 1, resetting the automatic control circuit of the transfer means 65. Also when relay 236 was energized a circuit was made from conductor 7 through contact 236c' of relay 236, program progress light 458, indicating bale transfer conveyor means 65 is operating, to conductor 1. Then when relay 236 is deenergized, contact 236c' of this relay is opened deenergizing the circuit and program progress light 458. Only after the bale transfer means 65 is stopped by deenergizing relay 236 a circuit is made from conductor 7 through contacts 262f of relay 262, contact 261f of relay 261, contact 236d of relay 236, contact 266d of relay 266, unlatch coil 266cc of relay 266 to conductor 1. This completes the automatic programmed operating cycle of the secondary press and the press is ready to receive the next bale or mass.

The unique features of the electrical circuitry provide for interlocks between various operating means and progress of operations by sequential control through programmed circuitry. Also, in case of power failure or cutoff, electrical control is maintained through use of latching controls so the operation may continue when power is reestablished. Further, the programming is automatic yet manual controls required for maintenance, adjustment and inspection are provided in the electrical circuitry for manipulation of the principal steps of operation in sequence without loss of automatic programming. Such programming also provides for a timed relation of the various operating means to minimize the time of completing a cycle. Moreover, the adjustability of the various controls provides flexibility of operation with regard to the type of raw materials being processed and their moisture content, density and size of the masses and bales desired, rate of feed of the material, rate of formation, compaction and discharge of the mass, and recompaction and release of a bale.

Manual controls provide for flexibility of operation and they are interrelated to provide safety to the equipment and personnel, and operation without loss of programming. When the switch 422 is turned from NORMAL to MANUAL JOG, contacts 422a and 422c will open to deenergize pilot light 439 and conductor 404 respectively and all of the control circuit fed by it, while closing contact 422d to energize conductor 165A and contact 422b to energize coils of relays 247c, 255c, 250c, 264c, 257c, 258c, and pilot light 459 indicating that the electrical circuit is on MANUAL JOG. When these relay coils are energized, loads and their respective interlocking contacts are lifted out of the automatic circuits and inserted into the manual circuits to permit any desired single steps of manual operation. Completing any one manual step of operation permits the subsequent steps of the program to be performed through the automatic control if so desired by turning switch 422 from MANUAL JOG to NORMAL. Any manual step of operation can be performed provided it does not conflict with any previously partially completed step of operation that was manually or automatically established. Concurrent steps of operation cannot be made under manual control.

Following the sequence of operations the primary ram 59 can be manually jogged forward or reverse in any portion of its total stroke providing the bale length control switch LS6 has not been actuated or the stroke counter 414 has not counted out in which case the ram 59 can only be jogged forwardly. This manual mode of operation prevents formation of an oversized bale. To manually jog the ram 59 rearwardly, a spring return switch 45 is held in RETRACT position which closes contacts 45a to complete a circuit from conductor 165A through contact 414b of stroke counter 414, contact LS6c of switch LS6, contact 45a of switch 45, contact 247b of relay 247, contact 257a of relay 257, fuse F409, solenoid B of valve 308 and pilot light 411 to conductor 1. Energizing solenoid B of valve 308 causes its spool to shift directing fluid flow to rod end 91' of cylinder 91. A concurrent circuit is made from conductor 165A through contact 414b of stroke counter 414, contact LS6c of switch LS6, contact 45b of switch 45, contact 247f of relay 247, fuse F412, solenoid G of valve 317, to conductor 1. Energizing solenoid G of valve 317 causes its spool to shift allowing fluid flow from cap end 91" of cylinder 91. To manually jog the ram 59 forwardly, the spring return switch 45 is held in ADVANCE position which closes contacts 45c completing a circuit from conductor 165A through contact 45c, contact 247c' of relay 247, fuse F423, solenoid A of valve 308 and pilot light 441 to conductor 1. Energizing solenoid B of valve 308 causes its spool to shift directing fluid flow to cap end 91" of cylinder 91.

To manually jog the resistance ram 60 rearwardly a spring return switch 46 is held in RETRACT position which closes contacts 46a and 46g completing a circuit from conductor 165A through contact 45d and 45e of switch 45, contacts 47b and 47a of switch 47 contact 255e of relay 255, contact LS1c of switch LS1, contact 255h of relay 255, conductor 461, contact 46a of switch 46, conductor 462, fuse F424, solenoid E of valve 354 and pilot light 442, contact 46g of switch 46, contact 250e of relay 250 to conduct 1. A parallel circuit extends from conductor 462 through 258a of relay 258, coil 259c of relay 259, contact 46g of switch 46, contact 250e of relay 250 to conductor 1 thereby closing its contact 259a connecting conductor 462 through said contact to conductor 460, contact 257a of relay 257, fuse F409, solenoid B of valve 308 and pilot light 411 to conductor 1. Energizing solenoid E of valve 354 causes its spool to shift opening fluid circuit to rod end 94" of cylinder 94 and energizing solenoid B of value 308 causes its spool to shift providing fluid flow through valves 308 and 354 to cause resistance ram 60 to retract. To manually jog the resistance ram 60 forwardly the spring return switch 46 is held in ADVANCE position which closes contacts 46b and 46h of switch 46 to complete a circuit from conductor 461 through contact 46b of switch 46, conductor 463, fuse F436, solenoid F of valve 354 and pilot light 433, contact 46h of switch 46, contact 250e to conductor 1. A parallel circuit is established from conductor 463 through 258d of relay 258, coil 267c of relay 267, contact 46h of switch 46, contact 250e of relay 250 to conductor 1 thereby closing its contact 267a of relay 267, connecting conductor 460 through contact 257a of relay 257, fuse F409, solenoid B of valve 308 and pilot light 411 to conductor 1. Energizing solenoid F of valve 354 causes its spool to shift opening fluid flow to the cap end 94' of cylinder 94, and energizes solenoid B of valve 308 to cause its spool to shift providing fluid flow through valves 308 and 354 to cause the resistance ram to advance. This step of manual operation of ADVANCE or RETRACT of resistance ram 60 is only possible if the ejector ram 61 is fully retracted with its abutment 99 actuating switch LS1 and there is no concurrent operation of switches 45 or 46. Should a mass be ejected manually from the primary press and the ejector ram 61, resistance ram 60 and primary ram 59 are manually restored to their normal stored positions, the stroke counter 414 is reset to its full count by manually pushing switch PB41. A circuit is established from conductor 404 through contact 412 of switch PB41, counter clutch coil 414cc to conductor 1. A concurrent parallel circuit is made from conductor 404 through contact 41b, contacts 249e of relay 249, coil 249cc to conductor 1 closing contact 249a thereby providing for continuity of the circuit when switch LS6 is closed by the retraction of resistance ram 60.

To manually jog the ejector ram 61 forwardly the spring return switch 47 is held in ADVANCE position which closes contacts 47c and 47d completing a circuit from conductor 165A through contact 45f and 45g of switch 45, contact 46d and 46c of switch 46, contacts 47c of switch 47, contact LS11b of switch LS11, contact LS7c of switch LS7, conductor 464, contact 47d of switch 47, conductor 465, contact LS13a of switch LS13, fuse F429, solenoid C of valve 358 and pilot light 431, conductor 41, contact 255d of relay 255, to conductor 1. A parallel circuit is established from conductor 465 through contact 258b of relay 258, coil 268c of relay 268, contact 255d of relay 255 to conductor 1, thereby closing contact 268a of relay 268, connecting conductor 460 through 257a of relay 257, fuse F409, solenoid B of valve 308 and pilot light 411 to conductor 1. Energizing solenoid C of valve 358 causes its spool to shift, opening the fluid circuit to cap end 97' of cylinder 97, and energies solenoid B of valve 308 to cause its spool to shift and provide full pump pressure fluid flow through valve 358 to drive the ejector ram 61 forwardly. To manually jog the ejector ram 61 rearwardly the spring return switch 47 is held in RETRACT position which closes contacts 47e and 47c of switch 47, completing a circuit between conductor 464 and contact 47e, contact 255a of relay 255, conductor 466, fuse F432, solenoid D of valve 358 and pilot light 444, contact 255d of relay 255 to conductor 1. A parallel circuit is established from conductor 466 through contact 258c' of relay 258, coil 269c of relay 269, contact 255d of relay 255 to conductor 1 thereby closing contact 269a of relay 269 connecting conductor 460 through 257a of relay 257, fuse F409, solenoid B of valve 308 and pilot light 411 to conductor 1. Energizing solenoid D of valve 358 causes its spool to shift, opening the fluid circuit to rod end 97" of cylinder 97, and energizies solenoid B of valve 308 to cause its spool to shift and provide full pump pressure fluid flow through valve 358 to drive the ejector ram 61 rearwardly. This step of manual operation of ADVANCE or RETRACT of ejector ram 61 is only possible if the bale transfer chain 222 of the bale transfer means 64 is in stored position with its bar and assocaited trip plate depressing switch LS13, the resistance ram 60 is fully retracted with its abutment 96 actuating switch LS7, the secondary press ram 63 is fully retracted with its associated abutment 103 actuating switch LS11, and there is no concurrent operation of switches 45 and 46. The primary press automatic cycle can be reestablished by turning switch 422 from MANUAL JOG to NORMAL when the ejector ram is in its fully advanced position with abutment 99 actuating switch LS2.

To manually jog the compress ram 63 forwardly a spring return switch 48 is held in ADVANCE position which closes contact 48a completing a circuit from conductor 165A through contacts 45d and 45e of switch 45, contacts 47b and 47a of switch 47, contact 255e of relay 255, contact LS1c of switch LS1, contact 255h of relay 255, conductor 461, contacts 46e and 46f of switch 46, contact 250f of relay 250, fuse F448, contact LS14a of switch LS14, fuse F468, contact LS15a of switch LS15, contact 264b of relay 264, contact LS13b of switch LS13, conductor 467, contact 264e of relay 264, contact 48a of switch 48, conductor 469, fuse F449, solenoid H of valve 368 and pilot light 450 to conductor 1. Energizing solenoid H of valve 368 causes its valve spool to shift allowing fluid flow to cap ends 101', 102', and 74' of cylinders 101, 102 and 74, respectively, driving the ram 63 forwardly.

To manually jog the compress ram 63 rearwardly the spring return switch 48 is held in RETRACT position which closes contact 48b completing a circuit from conductor 467 through contact 264e of relay 264, contact 48b of switch 48, fuse F453, solenoid J of valve 368 and pilot light 454 to conductor 1. Energizing solenoid J of valve 368 causes its spool to shift allowing fluid flow to rod ends 101" and 102" of cylinders 101 and 102, respectively, driving the ram 63 rearwardly. This step of manual operation of ADVANCE or RETREAT of the compress ram 63 is only possible if the bale transfer means 65 is in its normal stored condition with its bar 107 and associated plate 109 is actuating switch LS13, the ejector ram 61 is in its normal stored position with abutment 99 actuating the switches LS1 and LS15, the platform 200 is in its normal stored position with rod 224 depressing the switch LS14, and there is no concurrent operation of switches 46, 47 or 45.

In the event that the mode of operation was changed from automatic to manual during ejection of the mass from the primary press and the mass was finally ejected by the MANUAL JOG electric circuitry means, the automatic cycle of the secondary press can be manually initiated after turning switch 422 from MANUAL JOG to NORMAL by holding spring return switch 425 in the MANUAL position until relay 262 is latched as hereinafter described. The primary press at this time will be in its automatic mode of operation. A circuit is made from conductor 7 through contact 425b of switch 425, contact 242dd of relay 242, coil 241c of relay 241 and pilot light 13 indicating high density manual operation, to conductor 1. An additional circuit is made from conductor 7 through contact 241ee of relay 241, contact 263d of relay 263, contact 260b of relay 260, latch coil 260c of relay 260 to conductor 1, whereby contact 254d of relay 254 is by-passed when the latter is normally closed in automatic mode and the ejector ram and its abutment 99 advances to deactuate switch LS1. A subsequent circuit is made from conductor 7 through contact 241ff and 241gg of relay 241, contact 260d of relay 260, contact 261a of relay 261, contact 262c' of relay 262, latch coil 262c of relay 262, to conductor 1 whereby contacts 253f of relay 253 and 240b of relay 240 are by-passed when the latter are normally closed in automatic mode and the ejector ram and its abutment 99 actuates switch LS2 on its full forward stroke. When the spring return switch 425 is turned to AUTOMATIC position at this time in the baling cycle the electrical circuitry reverts to sustained automatic mode.

The bale transfer means 65 can be operated manually in ADVANCE or RETRACT direction by operation of switch 18 and turning switch 422 from NORMAL to MANUAL JOG. When turning switch 18 to MANUAL ADVANCE contact 18a is closed forming a circuit from conductor 165A through contacts 45d and 45e of switch 45, contacts 47b and 47a of switch 47, contact 255e of relay 255, contact LS1c of switch LS1, contact 255h of relay 255, conductor 461, contacts 46e and 46f of switch 46, contacts 250f of relay 250, conductor 471, fuse F488, contact LS14a of switch LS14, fuse F468, contact LS15a of switch LS15, contact 264b of relay 264, contact 257d of relay 257, conductor 470, contact LS11a of switch LS11, fuse F426, contact 258e of relay 258, conductor 270, contact 18a of switch 18, conductor 40, coil 237c of relay 237 and pilot light P11 to conductor 1, whereby the power means 106 will start and the bale transfer means 65 will move forwardly. A parallel circuit is made simultaneously from conductor 471 through contact 18g of switch 18, contact 257c' of relay 257, fuse F446, solenoid L of valve 394 to conductor 1 whereby the platform 200 is lowered. When the switch 18 is turned to the MANUAL RETRACT position contact 18b of switch 18 is closed forming a circuit from conductor 270 through contact 18b, conductor 472, coil 271c of relay 271, to conductor 1 whereby the power means 106 will start and the bale transfer means 65 will move rearwardly. A parallel circuit is made from conductor 471 through contact 18h of switch 18, contact 257c' of relay 257, fuse F446, solenoid L of valve 394 to conductor 1 whereby platform 200 is lowered. This step of manual operation of ADVANCE or RETRACT of the transfer means 65 is only possible if the ejector ram 61 is in its normally stored position with the abutment 99 actuating the switches LS1 and LS15, the bale platform 200 is lowered with rod 224 actuating switch LS14, the compress ram 63 is in its retracted position with its abutment 103 actuating switch LS11, and there is no concurrent operation of switches 45, 47 and 46. Auxiliary equipment such as conveyors, tipping devices, tying, wrapping and weighing equipment are controlled through contacts 18c of switch 18.

The sensors 401 and 402 located adjacent the top of the feed chute 53 may be utilized to operate auxiliary equipment not shown.

In view of the foregoing, it should be manifest that an improved apparatus and method have been provided for compacting material into a mass having a predetermined density and that the mass is recompacted to a greater or higher density to obtain a substantially self-standing bale possessing advantages over those made by conventional apparatus. It will be apparent that improved means have also been provided for synchronizing the operation of the various rams, venting the chamber and ram compartment and preventing surface glazing on the bale.

More particularly, it will be evident that the length of the layered mass 21, as shown in FIGURE 22, is somewhat greater than the length of the completed bale 23 shown in FIGURE 23. In FIGURE 24 portions of two adjacent layers of the mass have been parted to show the fibers on the opposed faces thereof. In this connection attention is directed to the fact that each layer of the mass includes a rear planar surface which is formed by engaging the face of the primary ram, a frontal face which is rougher or of a more varied character than the rear face so that during compaction the relaxed fibers on the rough faces are pressed into the fibers on the smooth faces in a manner whereby to obtain a nesting or interconnection of the fibers. When the mass 21 is recompressed to a greater density, the nesting fibers in the oppose faces of the mass are deformed beyond their elastic limits so that at least some of the fibers are set in order to insure a good bond or cohesiveness between the layers and, due to the tremendous forces exerted by the coacting means, the bale constitutes a highly compressed homogeneous product which is substantially self-standing and one in which the layers are not readily separable as compared to the layers in the mass. FIGURE 25 is a view showing an inner face of one of the parted portions of the mass shown in FIGURES 22 and 24 and generally illustrates the fact that the majority of the fibers in the faces are bent and compressed in areas as indicated at 28 while FIGURE 24 specifically shows that some of the fibers 29 are generally perpendicular to the faces.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. In combination: a chamber provided with an inlet for receiving material to be compacted and with a normally open outlet intermediate its length, means for compacting material received in said chamber in an area between said inlet and outlet into a mass of a predetermined density, means for ejecting all of the mass from said chamber through said outlet, and additional means contiguous to said outlet for recompacting the ejected mass into a bale of greater density.

2. The combination defined in claim 1, including means for operating said additional means in timed relation to said compacting means and said ejection means.

3. The combination defined in claim 1, including first means for receiving and conducting material to said inlet, and second means communicatively connecting said chamber with said receiving and conducting means whereby said second means will cause any air and/or dust in said chamber to flow into said first means for reentry into said chamber through said inlet.

4. The combination defined in claim 1, including means spaced from said inlet for receiving material, means communicatively connecting said receiving means and said inlet for conducting material to said chamber, a casing disposed adjacent and communicating with said inlet and said chamber, and conduit means communicatively connecting the interior of said casing and said receiving means whereby air and/or dust received in said casing from said chamber will be caused to reflow back through said conducting means and into said chamber via said receiving means.

5. The combination defined in claim 1, including means for conducting material into said chamber through said inlet, control means for cycling the operation of said additional means in timed relation to said compaction means and said ejection means, and means for synchronizing said control cycling means and said conducting means so that said compaction means will continuously operate to achieve maximum capacity.

6. The combination defined in claim 1, in which said compaction means comprises a primary ram and resistance ram which are axially aligned for compacting the material therebetween, said ejection means comprises a ram disposed transverse to the longitudinal axes of said primary and resistance rams, and said additional means comprises abutment means disposed contiguous to said outlet and a compress ram opposite said abutment means for recompacting the mass received through said outlet into a bale of a greater density.

7. The combination defined in claim 1, in which said additional means comprises stationary abutment means and a compress ram disposed opposite said abutment means whereby the mass may be recompacted therebetween while supported solely thereby.

8. The combination defined in claim 1, in which said additional means comprises coactible means, and vertically movable means is disposed contiguous to said outlet and which when moved to one position serves to initially facilitate supporting and clamping of the mass between said coactible means and when moved to another position serves to facilitate recompression of the mass into a bale while supported solely by said coactible means.

9. The combination defined in claim 1, including a platform disposed adjacent to said outlet for supporting the mass, and a pair of planar means disposed between said outlet and said platform whereby to facilitate correct ejection of the mass onto said platform.

10. The combination defined in claim 1, in which said compacting means comprises a primary ram and a resistance ram which are axially aligned, including readily removable bottom track means for said primary ram.

11. The combination defined in claim 1, including means whereby said compacting means and said reciprocating means may be operated jointly or separately.

12. In combination: structure forming a chamber provided with an inlet and a normally open outlet intermediate its length, means for compacting material received in said chamber into a mass, means for ejecting all of the mass through said outlet, and means contiguous to said outlet for recompacting the mass of material, said recompacting means comprising stationary abutment means and a ram suspended from locations thereabove for horizontal reciprocation relative to said abutment means.

13. In combination: an elongated chamber provided with an inlet adjacent one extremity for receiving material to be compacted and with a side outlet adjacent its opposite extremity, axially retractible means disposed in said chamber adjacent said outlet, a ram for compacting material received in said chamber through said inlet against said retractible means into a mass of predetermined density, means for ejecting all the mass from between said retractible means and said ram and through said outlet to a position which is in alignment with said ejecting means, and additional means for recompacting the mass to a greater density substantially at this position.

14. In combination: an elongated chamber having an inlet for receiving material and an outlet, a pair of axially aligned reciprocable rams for compacting the material received in said chamber into a mass having a predetermined density, means for actuating said rams to release the mass, a movable platform disposed adjacent said outlet, means for ejecting the mass through said outlet onto said platform, abutment means and an additional ram disposed on opposite sides of said platform, means for actuating said additional ram for initially clamping the mass between said abutment means and said ram while the mass is carried by said platform, means for lowering the platform to a predetermined position, means for applying a greater force to said additional ram for recompacting the mass while it is supported solely by the said abutment means and said additional ram to obtain a bale having a greater density, and then retracting said additional ram whereby the bale may readily fall onto said platform.

15. The combination defined in claim 14 including means operatively connected with said platform for transferring the bale therefrom.

16. The combination defined in claim 14, including means controlled by said additional ram for controlling the position of said platform.

17. In combination: a chamber provided with an entrance for receiving material to be compacted and with a normally open discharge opening intermediate its length, means including a ram head for compacting into a mass material received in said chamber through said entrance, means for ejecting all of the mass from said chamber through said discharge opening, a compartment aligned with said chamber for receiving said ram head when the latter is retracted, a casing structure, disposed above said compartment and provided with an inlet and an outlet, and means interposed between said chamber and said compartment adapted to define in combination with an upper underlying surface of said ram head a passage having a cross dimension which is less than a cross dimension of said inlet and provides communication between said chamber and said inlet so that any air and/or dust in said chamber may be caused to flow through said casing and the outlet therein.

18. In combination: a chamber provided with an inlet and a normally open outlet intermediate its length, means for compacting material received in said chamber through said inlet into a mass of predetermined density for discharge through said outlet, and means disposed in contiguous relation to said outlet and comprising stationary abutment means and a compress ram for recompressing the discharged mass, and means for suspending the ram from locations thereabove for reciprocation relative to said abutment means.

19. A machine for compacting material, said machine comprising an elongated chamber having an inlet for receiving the material and an outlet located intermediate its length, a pair of rams movable on the same axis in said chamber for compacting the material received into a compact mass and moving the mass to a position opposite said outlet, a third ram movable in a direction transverse to the axes of said pair of rams for ejecting all of the mass from said chamber outwardly through said outlet, abutment means located externally of said chamber, and a fourth ram movable toward said abutment means for recompacting the ejected mass between said abutment means and fourth ram.

20. The machine defined in claim 19, including evacuating means, and means communicatively connecting only a localized upper area of said chamber adjacent to said inlet with said evacuating means whereby some of the material to be compacted will be caused to flow upwardly in the chamber and thereby promote a substantially complete filling thereof.

21. In combination: structure comprising top and bottom walls and side walls defining an elongated chamber provided with an inlet at one extremity and an outlet inset from its opposite extremity, tubular means for directing material to said inlet, a pair of axially movable ram means for compacting therebetween material received in said chamber through said inlet and moving all of the compacted material to said outlet for ejection, at least one of said walls of said chamber being provided with tapered apertures, means defining in combination with said one wall a duct communicating with said apertures, and conduit means communicatively connecting said duct with said tubular means.

22. The combination defined in claim 21, including means for injecting a stream of air into said conduit means whereby to promote the flow of air and any loose material in said conduit means, and means for evacuating the air and loose material from said conduit means.

23. In combination: a chamber provided with an inlet for receiving material to be compacted and a normally open outlet intermediate its length, a chute connected to said inlet, a compartment aligned with said chamber and having a top wall, means including a ram which is movable in said chamber for compacting material received therein through said inlet into a mass of a predetermined density and being retractible into said compartment, means for ejecting the mass from said chamber through said outlet, a first overhead vertical wall constituting a wall of said chute depending between said chamber and said compartment, a second overhead articulated wall structure depending from said top wall into said compartment and disposed in spaced relation to said first wall to define an opening, and said first wall having a lower extremity which is disposed in a predetermined spaced relationship to an upper underlying surface of the ram to define a passage which is smaller than said opening and communicates with said chamber.

24. In combination: a plurality of walls including a slotted bottom wall defining an elongated chamber provided with an inlet adjacent one extremity for receiving material to be compacted and an outlet located intermediate its length, abutment means disposed in said chamber adjacent said outlet, a ram having a head for compacting material received in said chamber through said inlet against said abutment means into a mass of predetermined density and moving the mass by said ram to said outlet, a compartment aligned with said chamber for receiving said ram head when retracted, means for ejecting all of the mass from between said abutment means and said ram and transversely through said outlet, and a pair of elongated readily replaceable tracks for said ram head having inner extremities disposed in spaced parallel relationship in said compartment and outer extremities which are secured in the slots in said bottom wall.

25. In combination: a chamber provided with an inlet for receiving material to be compacted and with an outlet provided with a guide at one side thereof, means for compacting material received in said chamber through said inlet into a mass having a predetermined density, means for ejecting the mass from said chamber through said outlet, and coactible means contiguous to said outlet for recompacting the ejected mass into a bale of greater density, said coactible means including abutment means having a face aligned with said guide and a ram movable relative to said face and carrying a guide plate disposed in opposed relation to said guide for disposition adjacent an opposite side of said outlet when the ram is retracted a predetermined distance whereby to facilitate ejection of the mass through the outlet for reception by said coactible means.

26. In combination: a primary press provided with an outlet through which a compacted mass having a predetermined density may be ejected, a secondary press detachably connected to said primary press and comprising abutment means having a planar impact surface and a ram for movement relative to said abutment means for recompacting all of the ejected mass to a greater density to form a bale, means comprising an overhead longitudinal structure provided with bearing surfaces and members of substantial length on the ram engaging said surfaces providing ways above the ram whereby said ram is supported and stabilized for positive axial movement to continuously maintain an impact surface thereof exactly parallel to said impact surface of said abutment means.

27. The combination defined in claim 26, in which said members are readily removable and of an anti-friction character.

28. The combination defined in claim 26, in which the bearing surfaces of the overhead structure define a pair of generally V-shaped receiving means, and the ram is provided with hangers which support the members in a converging relation for reception in said receiving means.

29. The combination defined in claim 26, in which the areas of said impact surfaces are greater than the compressed faces of the bale.

30. Apparatus for the purpose described comprising top and bottom walls and side walls defining an elongated chamber having an inlet at one extremity and a side outlet inset from its opposite extremity, a primary ram and a resistance ram aligned with said primary ram for compacting material received in said chamber into a mass, an ejector ram for ejecting the mass through said outlet, tubular means for conducting material to said inlet, said chamber having an area below said inlet for receiving material to be compacted, an area in which the material is compacted into a mass, an area opposite said outlet through which the mass be ejected, certain of said walls defining said areas being provided with groups of apertures, and means for connecting said apertures to said conducting means for respectively venting said areas.

31. In combination: structure defining an elongated chamber having an inlet and an outlet intermediate its length, a primary ram and an axially movable resistance ram aligned with said primary ram for compacting material received in said chamber via said inlet into a mass therebetween and moving the mass to a position opposite said outlet, an ejector ram for ejecting all of the mass through said outlet, and coactible means including a compress ram for receiving and recompacting the mass to form a bale, said compress ram being operable for recompression only after the ejector ram has been fully retracted.

32. The combination defined in claim 31, including a platform aligned with said outlet, and said ejector ram ejects the mass directly onto said platform for recompaction by said coactible means.

33. The combination defined in claim 31, including a movable platform aligned with said outlet, said ejector ram ejects the mass directly onto said platform, and means controlled by said resistance ram for moving said platform to a position for receiving the mass.

34. The combination defined in claim 31, including means whereby said resistance ram cannot coact with said primary ram until said ejector ram has been fully retracted.

35. The combination defined in claim 31, including control means whereby said ejector ram cannot be actuated to eject the mass until said primary ram is in a fully advanced position and said resistance and compress rams are fully retracted.

36. The combination defined in claim 31, including sensing means controlled by the position of the mass or bale for controlling the operation of the ejector ram.

37. The combination defined in claim 31, including a movable platform aligned with said outlet for receiving the mass, means operatively associated with said platform for transferring a bale therefrom, and means operable by said transferring means for controlling the operation of said ejector ram.

38. A method which comprises compacting a material into a mass at one station within the confines of a chamber to obtain a predetermined density, transferring all of the mass laterally directly from a side outlet in said chamber to a second station beside said first station, and then recompressing the mass at the second station into a bale having a greater density.

39. A method which comprises compacting material in a walled chamber provided with an inlet and an outlet to obtain a mass having a predetermined density, moving all of the compacted mass laterally through said outlet from said chamber to a station externally thereof, and then recompressing the mass at the station between a pair of opposed vertical surfaces to obtain a bale having a greater density while supported solely by said surfaces whereby glazing of the mass is substantially prevented.

40. A method which comprises compacting material at one station between a pair of aligned axially movable means in an elongated chamber having an outlet intermediate its length to form a mass having a predetermined density and moving the mass by said means to said outlet, releasing the mass at the outlet, moving all of the mass transversely through said outlet to a second station, recompacting the mass between a pair of opposed coacting means at the second station to obtain a bale having a greater density, and automatically releasing the bale from the coacting means for support in a self-standing condition.

41. The method defined in claim 40, in which the compacted mass is of a fibrous character comprised of layers with at least some of the fibers at the adjacent faces of the layers being partially deformed to effect an interengagement thereof whereby to assist in maintaining the layers in assembled relation, and the interengaged fibers of the compacted mass are compressed beyond their elastic limits to obtain a setting thereof to bond the layers together.

42. The method defined in claim 43, including conducting the material downwardly through a chute into the chamber to form a vertical column therein, venting the chamber only in a localized area adjacent said chute, and evacuating the air from said area whereby to obtain substantially complete filling of the chamber with material.

43. A method which comprises compacting material at one station between a pair of axially aligned relatively movable means to form a mass having a predetermined density, releasing the mass, moving the mass to a second station for support on a platform, clamping the mass between a pair of opposed coacting means at said station while supported on the platform, lowering the platform to a position below said mass, and then recompacting the mass while supported solely by said coacting means to obtain a bale having a greater density, and then releasing the bale onto said platform in a self-standing condition.

References Cited

UNITED STATES PATENTS

| | | | |
|---|---|---|---|
| 828,213 | 8/1906 | Jones et al. | 100—207 |
| 250,135 | 11/1881 | Dederick | 100—189 X |
| 731,955 | 6/1903 | Root et al. | 100—215 X |
| 2,850,965 | 9/1958 | Soteropulos | 100—179 |
| 2,933,037 | 4/1960 | Russell | 100—98 |
| 2,984,172 | 5/1961 | Roberts et al. | 100—90 |
| 3,059,569 | 10/1962 | Nolt | 100—98 |
| 3,115,823 | 12/1963 | Nolt et al. | 100—142 |
| 3,185,074 | 5/1965 | Jay et al. | 100—189 X |
| 3,212,433 | 10/1965 | Raab | 100—53 X |
| 3,249,040 | 5/1966 | Van der Lely | 100—179 |
| 3,294,013 | 12/1966 | Seltzer | 100—49 |

FOREIGN PATENTS 1,057  1/1916  Netherlands.

WALTER A. SCHEEL, *Primary Examiner.*

U.S. Cl. X.R.

100—43, 189, 244

UNITED STATES PATENT OFFICE
CERTIFICATE OF CORRECTION

Patent No. 3,438,320                          April 15, 1969

Hilary A. Raab

It is certified that error appears in the above identified patent and that said Letters Patent are hereby corrected as shown below:

Column 3, line 43, "residue" should read -- reside --; line 48, before "will" insert -- or inventions --. Column 10, line 32, "down full line position" should read -- downward position --; line 52, "gerater" should read -- greater --. Column 17, line 7, "conduct 1" should read -- conductor 1 --; line 59, "242jj or" should read -- 242jj of --. Column 20, line 57, "for conductor" should read -- from conductor --. Column 21, line 23, "contact 237e" should read -- contact 247e --. Column 22, line 24, "press cycle" should read -- press' cycle --; line 30, "Press" should read -- Presses --; line 45, "contact 260'" should read -- contact 260c' --. Column 23, line 6, "LS12 is was" should read -- LS12 was --; line 65, "relay 269" should read -- relay 261 --; line 72, "236c to conductor" should read -- 236c of relay 236 to conductor --. Column 25, line 51, "to conduct 1" should read -- to conductor 1 --. Column 31, line 48, "raw" should read -- ram --. Column 32, line 58, "mass be ejected" should read -- mass may be ejected --; line 64, cancel "movable resistance", first occurrence; Column 34, line 10, "claim 43" should read -- claim 40 --.

Signed and sealed this 7th day of July 1970.

(SEAL)
Attest:

EDWARD M. FLETCHER, JR.                      WILLIAM E. SCHUYLER, JR.
Attesting Officer                              Commissioner of Patents